US008743042B2

(12) United States Patent
Sasaki et al.

(10) Patent No.: US 8,743,042 B2

(45) Date of Patent: Jun. 3, 2014

(54) DISPLAY DEVICE AND DRIVE METHOD FOR DISPLAY DEVICE

(75) Inventors: Yasushi Sasaki, Osaka (JP); Yuhichiroh Murakami, Osaka (JP); Shige Furuta, Osaka (JP); Seijirou Gyouten, Osaka (JP); Shuji Nishi, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 265 days.

(21) Appl. No.: 13/395,697

(22) PCT Filed: Apr. 23, 2010

(86) PCT No.: PCT/JP2010/057286

§ 371 (c)(1), (2), (4) Date: Mar. 13, 2012

(87) PCT Pub. No.: WO2011/033813

PCT Pub. Date: Mar. 24, 2011

(65) Prior Publication Data

US 2012/0169690 A1 Jul. 5, 2012

(30) Foreign Application Priority Data

Sep. 16, 2009 (JP) ................................ 2009-215068

(51) Int. Cl.

| | |
|---|---|
| ***G09G 3/36*** | (2006.01) |
| ***G06F 3/038*** | (2013.01) |
| ***G09G 5/00*** | (2006.01) |

(52) U.S. Cl.

CPC ............ *G09G 3/3607* (2013.01); *G09G 3/3618* (2013.01); *G09G 2300/0852* (2013.01); *G09G 2300/0861* (2013.01)

USPC .................. 345/98; 345/87; 345/90; 345/92; 345/99; 345/204

(58) Field of Classification Search

CPC .............. G09G 3/3607; G09G 3/3618; G09G 2300/0842; G09G 2300/0852; G09G 2300/0861

USPC ........................................... 345/87–104, 204

See application file for complete search history.

(56) References Cited

U.S. PATENT DOCUMENTS

| | | | | |
|---|---|---|---|---|
| 2001/0024187 A1* | 9/2001 | Sato et al. | ....................... | 345/98 |
| 2002/0075205 A1* | 6/2002 | Kimura et al. | .................. | 345/55 |
| 2007/0024566 A1 | 2/2007 | Miyazawa et al. | | |
| 2009/0303168 A1* | 12/2009 | Nagata | ............................ | 345/90 |

FOREIGN PATENT DOCUMENTS

| | | |
|---|---|---|
| JP | 2002-175051 A | 6/2002 |
| JP | 2002-229532 A | 8/2002 |
| JP | 2003-114651 A | 4/2003 |
| JP | 2004-077742 A | 3/2004 |
| JP | 2007-34095 A | 2/2007 |

OTHER PUBLICATIONS

International Search Report.

* cited by examiner

*Primary Examiner* — Ilana Spar

(74) *Attorney, Agent, or Firm* — Harness, Dickey & Pierce, P.L.C.

(57) ABSTRACT

Provided are a display device capable of preventing image noise arising from changes in potential of a common electrode and auxiliary capacitor lines at the time of a switch between a normal mode and a memory mode and a method for driving such a display device. In a case where it is necessary to cause the common electrode and the auxiliary capacitor lines to change in potential along with a switch between the normal mode and the memory mode, the change in potential is made while electrically connecting a node of each memory circuit to a corresponding source line with the corresponding source line having its potential fixed and with the memory circuit having its a switch circuit in a conductive state.

9 Claims, 13 Drawing Sheets

PERIOD OF SWITCHING FROM NORMAL DRIVING TO MEMORY DRIVING

DISPLAY DEVICE AND DRIVE METHOD FOR DISPLAY DEVICE

TECHNICAL FIELD

The present invention relates to a display device having a memory function and a method for driving such a display device and, particularly, to a technique for eliminating image noise arising from the existence of a plurality of driving methods in accordance with a display mode.

BACKGROUND ART

Conventionally, among liquid crystal display devices, there has been a memory-type liquid crystal display device including memory-containing pixels (hereinafter referred to as "pixel memories") and having a memory function that allows retention of image data. In such a liquid crystal display device, image data written to the pixels is retained by refreshing it while reversing its polarity, so that a still image can be displayed. During a normal operation (normal mode) in which the memory function is not used, the pixels are rewritten to new image data for each frame through the data signal lines. Meanwhile, during a memory operation (memory mode) in which the memory function is used, the image data is retained, so that it is not necessary to supply rewriting image data to the data signal lines.

Accordingly, during the memory operation, it becomes possible to suspend the operation of a circuit driving the scanning signal lines and the data signal lines and, therefore, to reduce power consumption. Moreover, a further reduction in power consumption can be achieved by reducing the number of times the large-capacity data signal lines are charged and discharged or dispensing with the transmission to a controller of image data corresponding to a period of the memory operation.

Therefore, such a memory-type liquid crystal display device is often used as a liquid crystal display device that displays images under strong demand for lower power consumption, as in the case of the standby screen of a cellular phone, for example.

FIG. 11 shows circuitry of a pixel memory (memory circuit MR100) extracted from a memory-type liquid crystal display device. The memory circuit MR100 is equivalent, for example, to the one disclosed in Patent Literature 1.

As shown in FIG. 11, the memory circuit MR100 includes a switch circuit SW100, a first data-retention section DS101, a data transfer section TS100, a second data-retention section DS102, and a refresh output control section RS100.

Further, the liquid crystal display device includes a substrate (not illustrated) having a matrix of such memory circuits MR100. The substrate is provided with a data transfer control line DTx, a gate line GLx, a High power line PHx, a Low power line PLx, a refresh output control line RCx, and an auxiliary capacitor line CSx for each row of the pixel matrix, and is provided with a source line SLx for each column of the pixel matrix. All these lines serve as wires to drive the memory circuits MR100.

The switch circuit SW100 is composed of a transistor N100, which is an N-channel TFT (thin-film transistor). The first data-retention section DS101 is composed of a capacitor Ca100. The data transfer section TS100 is composed of a transistor N101, which is an N-channel TFT. The second data-retention section DS102 is composed of a capacitor Cb100. The refresh output control section RS100 is composed of an inverter INV100 and a transistor N103, which is an N-channel TFT. The inverter INV100 is composed of a transistor P100, which is a P-channel TFT, and a transistor N102, which is an N-channel TFT.

It should be noted that such a field-effect transistor as the TFTs named above has two drain/source terminals one of which is called a first drain/source terminal and the other one of which is called a second drain/source terminal. However, the first drain/source terminal and the second drain/source terminal are called a drain terminal and a source terminal, respectively, or vice versa when they are definitely treated as such on the basis of the direction of flow of an electric current between them.

The transistor N100 has its gate terminal connected to the gate line GLx, its first drain/source terminal connected to the source line SLx, and its second drain/source terminal connected to a node PIX, which is an end of the capacitor Ca100, with the other end of the capacitor Ca100 connected to the auxiliary capacitor line CSx.

The transistor N101 has its gate terminal connected to the data transfer control line DTx, its first drain/source terminal connected to the node PIX, and its second drain/source terminal connected to a node MRY, which is an end of the capacitor Cb100, with the other end of the capacitor Cb100 connected to the auxiliary capacitor line CSx.

The inverter INV100 has its input terminal IP connected to the node MRY. The transistor P100 has its gate terminal connected to the input terminal IP of the inverter INV100, its source terminal connected to the High power line PHx, and its drain terminal connected to an output terminal OP of the inverter INV100. The transistor N102 has its gate terminal connected to the input terminal IP of the inverter INV100, its drain terminal connected to an output terminal OP of the inverter INV100, and its source terminal connected to the Low power line PLx.

The transistor N103 has its gate terminal connected to the refresh output control line RCx, its first drain/source terminal connected to the output terminal OP of the inverter INV100, and its second drain/source terminal connected to the node PIX.

Further, the liquid crystal display device includes a counter substrate (not illustrated) having a common electrode (counter electrode) COM, with the counter substrate being in such a position as to face the substrate having the memory circuits MR100. The substrate and the counter substrate are disposed in such a way that liquid crystals are sandwiched between them, and all these components constitute a liquid crystal panel. The node PIX of each of the memory circuits MR100 forms a liquid crystal capacitor C1*c* with the common electrode COM with liquid crystals sandwiched therebetween.

The memory operation (data-retention operation) of the memory circuit MR100 thus configured is explained below with reference to FIG. 12.

FIG. 12 is a timing chart showing waveforms of various signals during the memory mode in the memory circuit MR100.

During the memory mode, a driving circuit (not illustrated) applies a two-valued level potential, which consists of High (active-level) and Low (nonactive-level) levels of potential, to the data transfer control line DTx, the gate line GLx, and the refresh output control line RCx. The High and Low levels of potential may be set for each separate one of the lines.

Further, during the memory mode, the driving circuit (not illustrated) outputs a two-valued level data signal (also referred to as "two-valued data"), which consists of a High potential and a Low potential, to the source line SLx. A potential that is supplied through the High power line PHx is equal to the High potential of the two-valued level data signal, and a potential that is supplied through the Low power line PLx is equal to the Low potential of the two-valued level data signal. Furthermore, a potential that is supplied through the auxiliary capacitor line CSx may be constant or change at a predetermined timing. However, for simplicity of explanation, it is assumed here that the potential is constant.

During the memory mode, there are provided a total writing period T101 and a refresh period T102. The total writing period T101 is a period in which data to be retained in every memory circuit MR100 is written for each row. The total writing period T101 consists of a sequence of successive periods t101 and t102. Since, during the total writing period T101, line-sequential writing is performed on the memory circuits MR100, the period t101 for one row and that for another row are provided not to overlap. Therefore, the period t101 for one row and that for another row start at different timings. Further, the period t102 ends at the same timing in each row; that is, the total writing period T101 ends at the same timing in each row.

However, during the total writing period T101, the gate lines GL may be scanned at the same time in different rows, as long as timings (periods t101) of completion of scanning of the gate lines GL are shifted in sequence so that timings of completion of writing of data to the memory circuits MR101 vary from one row to another. For example, a method for scanning two gate lines GL every other gate line GL may be used. In the case of this method, while a timing of scanning for one row and that for another row may overlap, the timings of completion of writing of data vary.

The refresh period T102 is a period in which the data written to the memory circuits MR100 during the total writing period T101 is retained by refreshing it. The refresh period T102 has a sequence of successive periods t103 to t110. The refresh period T102 starts concurrently in each row.

During the period t101 in the total writing period T101, the gate line GLx has its potential raised to High. The potential of the data transfer control line DTx and that of the refresh output control line RCx are Low. This causes the transistor N100 to be in an ON state, whereby data potential (which is High here) supplied to the source line SLx is written to the node PIX.

Then, during the period t102, the gate line GLx has its potential dropped to Low. This causes the transistor N100 to be in an OFF state, whereby charge corresponding to the written data potential is retained in the capacitor Ca100.

It should be noted here that assuming that the memory circuit MR100 is composed solely of the capacitor Ca100 and the transistor N100, the node PIX becomes floating while the transistor N100 is in an OFF state. In an ideal state, the charge would be retained in the capacitor Ca100 so that the potential of the node PIX could be maintained at High.

In reality, however, there occurs an off-leakage current in the transistor N100; therefore, the charge in the capacitor Ca100 gradually leaks out of the memory circuit MR100. Because such a leakage of the charge in the capacitor Ca100 causes a change in the potential of the node PIX, a long-term leakage causes the potential of the node PIX to change to such an extent that the written data potential loses its original meaning.

Accordingly, during the refreshing period T102 that follows, the data transfer section TS100, the second data-retention section DS102, and the refresh output control section RS100 are made to function to refresh the potential of the node PIX so that the written data is not lost.

During the potential t103 in the refresh period T102, the data transfer control line DTx has its potential raised to High. The potential of the gate line GLx and the potential of the refresh output control line RCx are Low. This causes the transistor N101 to be in an ON state, whereby the capacitor Cb100 is connected in parallel to the capacitor Ca100 through the transistor N101. This causes a charge transfer between the capacitor Ca100 and the capacitor Cb100, whereby the potential of the node MRY becomes High.

It should be noted that the capacitor Ca100 has a larger capacitance value than the capacitor Cb100. Positive charge is transferred from the capacitor Ca100 to the capacitor Cb100 through the transistor N101 until the potential of the node PIX becomes equal to the potential of the node MRY. Although this causes the potential of the node PIX to be lower than the potential of the node PIX during the period t102 by a slight voltage ΔV1, the potential of the node PIX remains within a High potential range.

During the period t104 that follows, the data transfer control line DTx has its potential dropped to Low. This causes the transistor N101 to be in an OFF state, whereby the charge is retained in the capacitor Ca100 so that the potential of the node PIX is maintained at High and the charge is retained in the capacitor Cb100 so that the potential of the node MRY is maintained at High.

During the period t105, the refresh output control line RCx has its potential raised to High. This causes the transistor N103 to be in an ON state, whereby the output terminal OP of the inverter INV100 is connected to the node PIX. Since an inversion potential (which is Low here) of the potential of the node MRY is being outputted through the output terminal OP, the node PIX is charged by the inversion potential.

During the period t106, the refresh output control line RCx has its potential dropped to Low. This causes the transistor N103 to be in an OFF state, whereby the charge is retained in the capacitor Ca100 so that the potential of the node PIX is maintained at the inversion potential.

During the period t107, the data transfer control line DTx has its potential raised to High. This causes the transistor N101 to be in an ON state, whereby the capacitor Cb100 is connected in parallel to the capacitor Ca100 through the transistor N101. This causes a charge transfer between the capacitor Ca100 and the capacitor Cb100, whereby the potential of the node MRY becomes Low. It should be noted that positive charge is transferred from the capacitor Cb100 to the capacitor Ca100 through the transistor N101 until the potential of the node MRY becomes equal to the potential of the node PIX. Although this causes the potential of the node PIX to be lower than the potential of the node PIX during the period t106 by a slight voltage ΔV2, the potential of the node PIX remains within a Low potential range.

During the period t108, the data transfer control line DTx has its potential dropped to Low. This causes the transistor N101 to be in an OFF state, whereby the charge is retained in the capacitor Ca100 so that the potential of the node PIX is maintained at Low and the charge is retained in the capacitor Cb100 so that the potential of the node MRY is maintained at Low.

During the period t109, the refresh output control line RCx has its potential raised to High. This causes the transistor N101 to be in an ON state, whereby the output terminal OP of the inverter INV100 is connected to the node PIX. Since an inversion potential (which is High here) of the potential of the node MRY is outputted through the output terminal OP, the node PIX is charged by the inversion potential.

During the period t110, the refresh output control line RCx has its potential dropped to Low. This causes the transistor N103 to be in an OFF state, whereby the charge is retained in the capacitor Ca100 so that the potential of the node PIX is maintained at the inversion potential.

During the refresh period T102 that follows, the operation from the period t103 to the period t110 is repeated until a transition is made to the next total writing period T101 or to the normal mode. During the period t105 in the refresh period T102, the potential of the node PIX is refreshed to be an inversion potential, and during the period t109 in the refresh period T102, the potential of the node PIX is refreshed to be the potential that the node PIX had during writing. It should be noted that in a case where a Low data potential is written to the node PIX during the period t101 in the total writing period T101, the shape of potential of the node PIX looks like an inversion of that shown in FIG. 12.

In this way, the memory circuit MR100 allows data written during the total writing period T1 to be refreshed by a data inversion method during the refresh period T2. This makes it possible to curb the influence of a decrease in charge due to off-leakage. Further, depending on the timing when the data written to the node PIX is refreshed, i.e., on the timing when the polarity is reversed, the potential of the common electrode COM is inverted between High and Low. This makes it possible to refresh the screen while carrying out AC driving of the liquid crystal capacitor C1*c*.

Incidentally, although, in the conventional memory-type liquid crystal display device, a reduction in power consumption is achieved through the memory mode, image noise (image distortion) sometimes occurs during at the time of a switch from one driving method to another since there exist a plurality of driving methods in accordance with a display mode.

For example, after a switch from the memory mode to the normal mode has been made, data in accordance with which a still image is displayed is retained in the pixel memories. As a result, when a switch from the normal mode to the memory mode is made next, image noise sometimes occurs because totally different data is displayed, albeit for a fleeting second, during a period up to completion of writing of new data to the pixel memories. In view of this, Patent Literature 2, for example, discloses a technique for retaining totally black/totally white data in every pixel memory at the end of a period in the memory mode during which a still image is displayed, i.e., for initializing the data-retention sections of the pixel memories. This prevents the previous data from being displayed when a switch from the normal mode to the memory mode is made next, thereby preventing image noise.

CITATION LIST

Patent Literature 1

Japanese Patent Application Publication, Tokukai, 2002-229532 A (Publication Date: Aug. 16, 2002)

Patent Literature 2

Japanese Patent Application Publication, Tokukai, 2002-175051 A (Publication Date: Jun. 21, 2002)

SUMMARY OF INVENTION

Technical Problem

However, separately from image noise that occurs for such a reason as that stated above, the conventional memory-type liquid crystal display device sometimes suffers from image noise due to changes in potential of the common electrode COM and the auxiliary capacitor lines CSx when a switch in mode between the normal mode and the memory mode is made.

FIG. 13 is a timing chart showing waveforms of various signals in a case where image noise is generated when a switch from the normal mode to the memory mode is made in a conventional liquid crystal display device including memory circuits MR100. CSx1, CSx2, and CSx480 indicate the potentials of the auxiliary capacitor lines CSx in the 1st, 2nd, and 480th rows, respectively. PIX1, PIX2, and PIX480 indicate the potentials of the pixel electrodes of the memory circuits MR100 in the 1st, 2nd, and 480th rows, respectively. Further, COM1, COM2, and COM480 indicate the potential of the common electrode COM in the 1st, 2nd, and 480th rows, respectively; however, the common electrode has a potential common to all rows.

Since, during the normal mode, CC driving is carried out, the potential of the common electrode COM is held constant, and the potentials of the auxiliary capacitor lines CS are inverted between High and Low in accordance with the timing of writing of data to their respective memory circuits MR100.

Meanwhile, during the total writing period of the memory mode, the common electrode COM and the auxiliary capacitor lines CSx have their potentials fixed at a predetermined potential (which is Low here). It should be noted that at this point in time, the common electrode COM may have its potential set at a predetermined potential that is different from the potential at which the common electrode COM is set during the normal mode.

Therefore, as shown in FIG. 13, there is a case where the common electrode COM and the auxiliary capacitor lines CSx become different in potential between before a shift from the normal mode to the memory mode and after the shift. Since, at this point in time, each memory circuit MR100 has its node PIX in a floating state, the node PIX is suffers from a change due to a change in potential of the auxiliary capacitor line CSx (shift to a predetermined potential). Further, since the potential of the common electrode COM, which serves a reference voltage, also changes, there is a significant change in liquid crystal application voltage, with the result that image noise is generated.

Thus, in the conventional memory-type liquid crystal display device, image noise is sometimes generated by the pixels suffering from changes since the pixel electrodes are floating in a case where the common electrode and the auxiliary capacitor lines change in potential at the time of a switch between the normal mode and the memory mode.

The present invention has been made in view of the foregoing conventional problems, and it is an object of the present invention to provide a display device capable of preventing image noise arising from changes in potential of a common electrode and auxiliary capacitor lines at the time of a switch between a normal mode and a memory mode and a method for driving such a display device.

Solution to Problem

In order to solve the foregoing problems, a display device of the present invention is a display device (i) including a display panel provided with a matrix of memory circuits and (ii) having a normal mode during which a display is carried out by a data signal potential written to the memory circuits for each frame and a memory mode during which a display is carried out by refreshing and retaining a data signal potential written to the memory circuits, the display panel including data signal lines, scanning signal lines, auxiliary capacitor lines, and a common electrode, the memory circuits each including: a pixel electrode; a first switch circuit for selectively making conduction or cutoff (an electrical connection or disconnection) between a corresponding one of the data signal lines and the pixel electrode in accordance with a potential of a corresponding one of the scanning signal lines; a first capacitor formed between the pixel electrode and a corresponding one of the auxiliary capacitor lines; and a refresh control section for controlling a refresh of a potential of the pixel electrode, in a case where it is necessary to cause the common electrode and the auxiliary capacitor lines to change in potential along with a switch between the normal mode and the memory mode, the change in potential being made while electrically connecting the pixel electrode of each of the memory circuits to the data signal line with the data signal line having its potential fixed and with the first switch circuit in a conductive state.

Further, in order to solve the foregoing problems, a method for driving a display device of the present invention is a method for driving a display device (i) including a display panel provided with a matrix of memory circuits and (ii) having a normal mode during which a display is carried out by a data signal potential written to the memory circuits for each frame and a memory mode during which a display is carried out by refreshing and retaining a data signal potential written to the memory circuits, the display panel including data signal lines, scanning signal lines, auxiliary capacitor lines, and a common electrode, the memory circuits each including: a pixel electrode; a first switch circuit for selectively making conduction or cutoff between a corresponding one of the data signal lines and the pixel electrode in accordance with a potential of a corresponding one of the scanning signal lines; a first capacitor formed between the pixel electrode and a corresponding one of the auxiliary capacitor lines; and a refresh control section for controlling a refresh of a potential of the pixel electrode, in a case where it is necessary to cause the common electrode and the auxiliary capacitor lines to change in potential along with a switch between the normal mode and the memory mode, the method making the change in potential while electrically connecting the pixel electrode of each of the memory circuits to the data signal line with the data signal line having its potential fixed and with the first switch circuit in a conductive state.

Conventionally, image noise has sometimes been generated by the pixels suffering from changes since the pixel electrodes are floating in a case where the common electrode and the auxiliary capacitor lines change (shift) in potential at the time of a switch between the normal mode and the memory mode.

According to the foregoing configuration and method, on the other hand, in a case where it is necessary to cause the common electrode and the auxiliary capacitor lines to change in potential along with a switch between the normal mode and the memory mode, the change in potential being made while electrically connecting the pixel electrode of each of the memory circuits to the data signal line with the data signal line having its potential fixed and with the first switch circuit in a conductive state. That is, with the pixel electrode of each memory circuit fixed at a potential, the common electrode and the auxiliary capacitor lines are made to change (shift) in potential to a predetermined potential. This frees the pixel electrode of each memory circuit from the influence of the change, thus making it possible to prevent image noise.

Advantageous Effects of Invention

As described above, a display device of the present invention is a display device (i) including a display panel provided with a matrix of memory circuits and (ii) having a normal mode during which a display is carried out by a data signal potential written to the memory circuits for each frame and a memory mode during which a display is carried out by refreshing a data signal potential written to the memory circuits, the display panel including data signal lines, scanning signal lines, auxiliary capacitor lines, and a common electrode, the memory circuits each including: a pixel electrode; a first switch circuit for selectively making conduction or cutoff between a corresponding one of the data signal lines and the pixel electrode in accordance with a potential of a corresponding one of the scanning signal lines; a first capacitor formed between the pixel electrode and a corresponding one of the auxiliary capacitor lines; and a second capacitor formed between the memory electrode and the auxiliary capacitor line; and a refresh control section for controlling a refresh of a potential of the pixel electrode, in a case where it is necessary to cause the common electrode and the auxiliary capacitor lines to change in potential along with a switch between the normal mode and the memory mode, the change in potential being made while electrically connecting the pixel electrode of each of the memory circuits to the data signal line with the data signal line having its potential fixed and with the first switch circuit in a conductive state.

Therefore, in a case where it is necessary to cause the common electrode and the auxiliary capacitor lines to change in potential along with a switch between the normal mode and the memory mode, the common electrode and the auxiliary capacitor lines are made to change (shift) in potential to a predetermined potential with the pixel electrode of each memory circuit fixed at a potential. This frees the pixel electrode of each memory circuit from the influence of the change, thus bringing about an effect of making it possible to prevent image noise.

DESCRIPTION OF EMBODIMENTS

[Embodiment 1]

Figure 1:
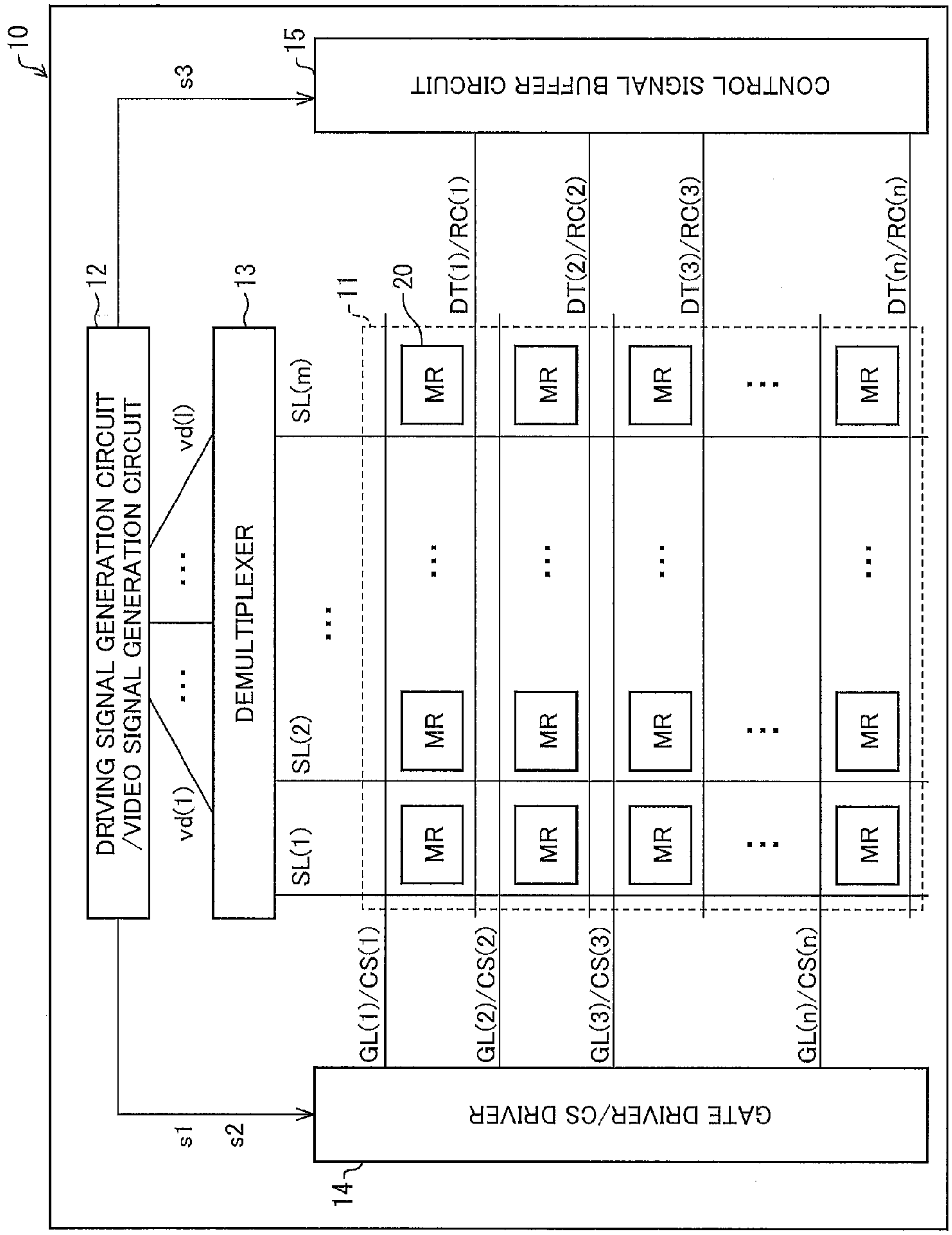
FIG. 1 is a block diagram showing a configuration of a liquid crystal display device according to an embodiment of the present invention.

An embodiment of the present invention is described below with reference to the drawings. It should be noted that components other than those described in the present embodiment are identical to those described in the Background Art section. Further, for convenience of explanation, members having the same functions as those shown in the drawings of the Background Art section are given the same reference numerals, and as such, are not described below.

In the present embodiment, a memory-type liquid crystal display device is described. A liquid crystal display device of the present embodiment includes, as each pixel memory, a memory circuit MR100 shown in FIG. 11.

What is worth noting here is the operation of the memory circuits MR100 to prevent image noise from being generated in a case where the common electrode and the auxiliary capacitor line CSx change in potential at the time of a switch between the normal mode and the memory mode. Accordingly, the operation of the memory circuits MR100 in such a case is described below.

Figure 13:
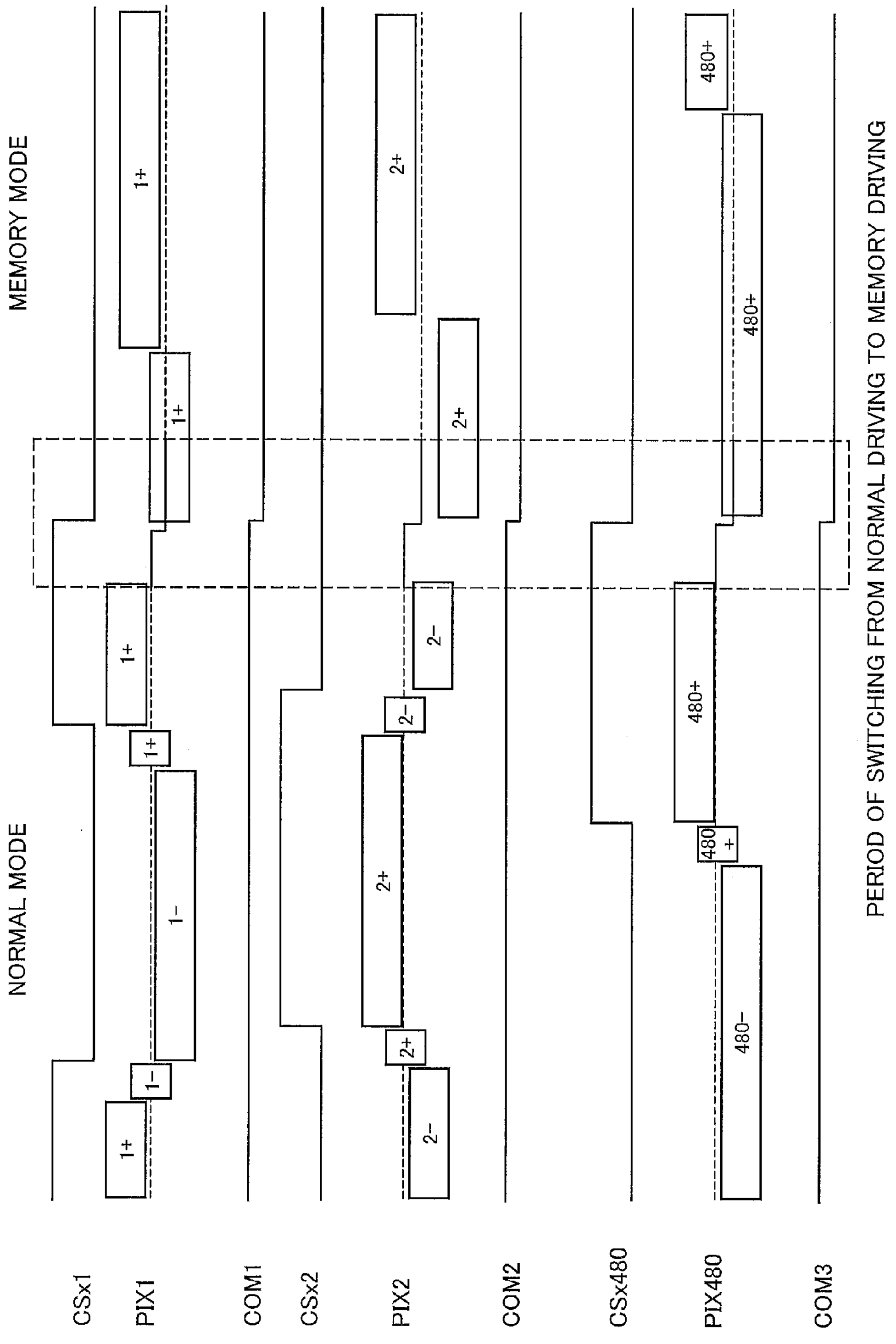
FIG. 13 is a timing chart showing waveforms of various signals in a case where image noise is generated when a switch from the normal mode to the memory mode is made in the conventional liquid crystal display device.
Figure 14:
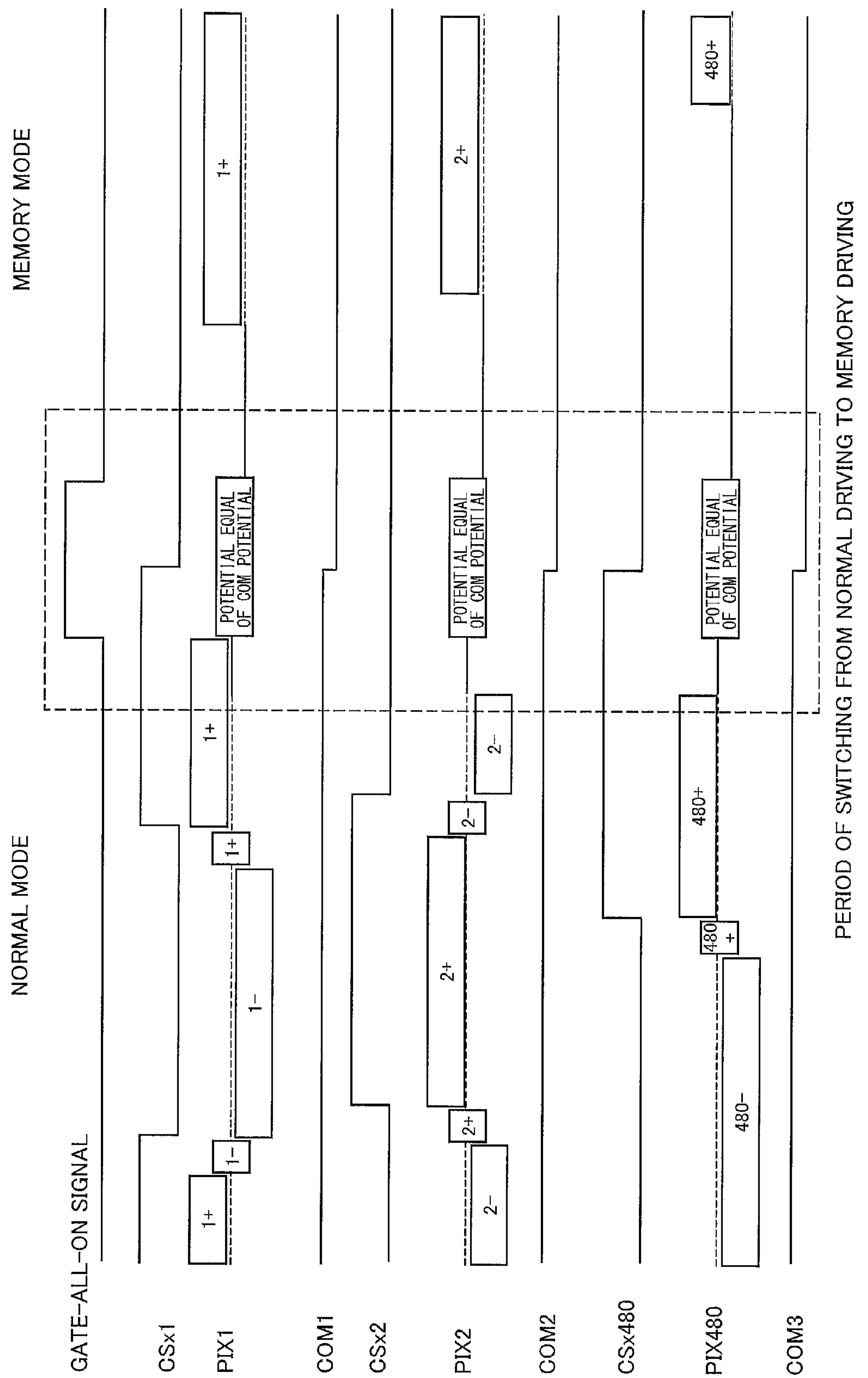
FIG. 14, showing another embodiment of the present invention, is a timing chart showing waveforms of various signals in a case where an operation of preventing image noise is carried out when a switch from the normal mode to the memory mode is made in the pixel memory of FIG. 11.

FIG. 14 is a timing chart showing waveforms of various signals in a case where an operation of preventing image noise is carried out when a switch from the normal mode to the memory mode is made in the liquid crystal display device of the present embodiment. The various signals shown in FIG. 14 are the same as those shown in FIG. 13, with the addition of a gate-all-ON signal.

As shown in FIG. 13, the liquid crystal display device is configured such that in a case where it is necessary to cause the common electrode COM and the auxiliary capacitor lines CSx to change in potential along with a switch between the normal mode and the memory mode, such a change in potential is made while holding the node PIX of each memory circuit MR100 at a potential equal to the potential of the common electrode COM with the transistor N100 of every memory circuit MR100 put in an on state by outputting a potential equal to the potential of the common electrode COM to all the source lines SLx and bringing all the gate lines GLx to a High (active) potential.

That is, with the node PIX of each memory circuit MR100 fixed at a potential equal to the potential of the common electrode COM, the common electrode COM and the auxiliary capacitor lines CSx are made to change (shift) in potential to a predetermined potential. This frees the node PIX of each memory circuit MR100 from the influence of the change, thus making it possible to prevent image noise.

For example, in the case of normally black, image noise can be prevented in the following manner: the pixels are brought to a black potential at the time of a switch from the normal mode to the memory mode by turning ON the transistor N100 of every memory circuit MR100; then, with the pixels fixed at the black potential, the common electrode COM and the auxiliary capacitor lines CSx are made to change (shift) in potential to a predetermined potential.

Although, in the foregoing description, the node PIX of each memory circuit MR100 is fixed at a potential equal to the potential of the common electrode COM by outputting a potential equal to the potential of the common electrode COM to all the source lines SLx, this does not imply any limitation. The potential of the node PIX needs only be fixed by connecting the node PIX to the source line SLx with the potential of the source line SLx fixed.

[Embodiment 2]

Another embodiment of the present invention is described below with reference to the drawings.

Figure 11:
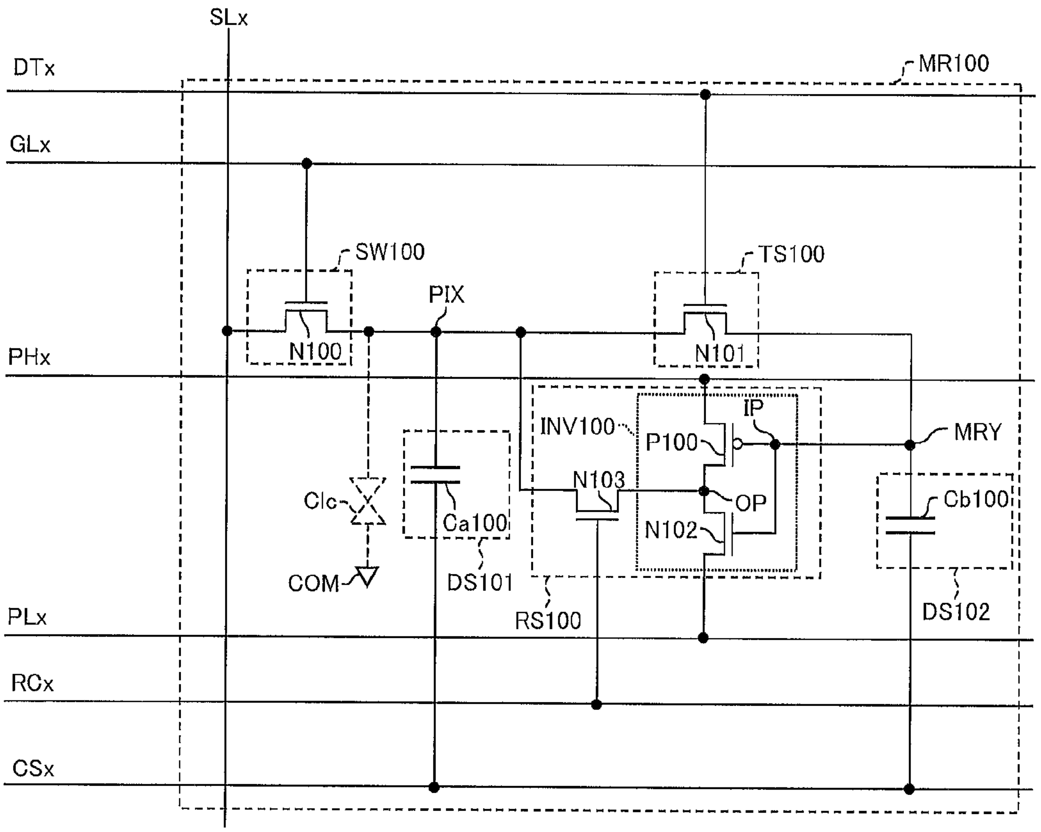
FIG. 11 is an equivalent circuit diagram showing an example of an electric configuration of each pixel memory in a conventional liquid crystal display device.

Since the memory circuit MR100 shown in FIG. 11 has a data-refreshing circuit provided with the data transfer section TS100 composed of the transistor N101, during those periods t104 to t106 and t108 to t110 in the refresh period T102 in which the data transfer control line DTx has its potential nonactive (which is Low here), the node MRY is disconnected from the node PIX to be in a floating state.

During the periods t105 to t106, in particular, the node PIX has a potential corresponding to Low, while the node MRY has a potential corresponding to High. Further, during the periods t109 to t110, the node PIX has a potential corresponding to High, while the node MRY has a potential corresponding to Low. For this reason, during these periods, the potential of the node MRY gradually changes over time due to an off-leakage current of the transistor N101, although the transistor N101 is in an OFF state.

It should be noted that although, during floating, each node is affected by a change in potential due to parasitic capacitance of a transistor, a wire, or the like, this specification leaves a change in potential due to parasitic capacitance out of consideration for simplicity and convenience of explanation.

Assuming that a is the change in potential of the node MRY due to an off-leakage current, the potential of the node MRY during the periods t103 to t105 is (High potential−ΔV1−α), which invites a further change in potential in addition to the change in potential ΔV1 due to charge partitioning, these changes in potential are combined to lead to a change in potential (ΔV1+α). Further, the potential of the node MRY during the periods t107 to t109 is (Low potential+ΔV2+α), which invites a further change in potential in addition to the change in potential ΔV2 due to charge partitioning, and these changes in potential are combined to lead to a change in potential (ΔV2+α).

In the result, assuming that Vth is the threshold voltage of the transistors P100 and N102, which constitute the inverter INV100, the transistor N100 gradually comes into an ON state in a case where the potential of the node MRY (High potential−ΔV1−α) has fallen short of (High potential−ΔV1). Since, at this point in time, the transistor N102 is in an ON state, there occurs such a problem that a large consumption current is generated due to the flow of a through current from the High power line PHx to the Low power line PLx through the transistors P100 and N102.

Further, in such a state where such a through current flows, the output of the inverter INV100 gradually becomes a potential between High and Low. This causes the potential of the node PIX to be a potential between High and Low, too, and when the potential of the node PIX becomes a potential that cannot be determined to be High or Low, a malfunction occurs in the memory circuit MR100.

Similarly, the transistor N102 gradually comes into an ON state in a case where the potential of the node MRY (Low potential+ΔV2+α) has become higher than (Low potential+Vth). Since, at this point in time, the transistor P100 is in an ON state, there occurs such a problem that a large consumption current is generated due to the flow of a through current from the High power line PHx to the Low power line PLx. If this causes the potential of the node PIX to be a potential that cannot be determined to be High or Low, then a malfunction occurs in the memory circuit MR100.

As above, in a liquid crystal display device provided with memory circuits MR100 each including a pixel electrode (which correspond to the node PIX) to which a data signal potential is written, a memory electrode (which corresponds to the node MRY) to which charge is transferred from the pixel electrode so that the potential of the pixel electrode is refreshed, and a transfer element (which corresponds to the transistor N101) provided between the pixel electrode and the memory electrode, a circuit that carries out a refresh operation in accordance with the potential of the memory electrode may sometimes be made incapable, due to the presence of an off-leakage current in the data transfer element, of appropriately carrying out the operation that it is supposed to carry out.

Therefore, it is desirable that a liquid crystal display device be provided which includes memory circuits each of which, even in the presence of an off-leakage current in a transfer element, allows a circuit that carries out a refresh operation to appropriately carry out the operation that it is supposed to carry out.

FIG. 1 is a block diagram showing an example of a configuration of a liquid crystal display device 10 of the present embodiment.

As shown in FIG. 1, the liquid crystal display device 10, which is a memory-type liquid crystal display device, includes a pixel array 11, a driving signal generation circuit/video signal generation circuit 12, a demultiplexer 13, a gate driver/CS driver 14, and a control signal buffer circuit 15.

The pixel array 11 is a matrix of pixel memories 20 (represented as “MR” in FIG. 1) arranged in n rows and m columns. Further, the pixel array 11 is provided with a gate line GL(i) (scanning signal line), an auxiliary capacitor line CS(i), a data transfer control line DT(i) (data transfer line), and a refresh output control line RC(i) (refresh output line) for each row of the pixel matrix, and is provided with a source line SL(j) (data signal line) for each column of the pixel matrix. It should be noted that i is an integer of $1 \leq i \leq n$ and j is an integer of $1 \leq j \leq m$.

Each of the pixel memories 20 has a memory function and independently retains data. Writing and retention of a data signal in the pixel memory 20 located at a point of intersection between the ith row and the jth column are controlled by the gate line GL(i) connected to the ith row, the auxiliary capacitor line CS(i) connected to the ith row, the data transfer control line DT(i) connected to the ith row, the refresh output control line RC(i) connected to the ith row, and the source line SL(j) connected to the jth column.

The driving signal generation circuit/video signal generation circuit 12 is a control drive circuit for, in accordance with a driving method, controlling and driving the supply of a video signal (data signal) to the pixel memory 20 and the operation of the gate driver/CS driver and the control signal buffer circuit 15, and has functions equivalent to those of a display data processing circuit, an input-output interface, a command decoder, a timing control circuit, etc. The driving signal generation circuit/video signal generation circuit 12 carries out input and output of data between the liquid crystal display device 10 and an external device and loads data-writing/data-retention command data and display data from the external device. The driving signal generation circuit/video signal generation circuit 12 generates, in accordance with the display data thus loaded, a data signal to be supplied to the pixel array 11, and output the data signal to an output signal line vd(k) (where k is an integer of $1 \leq k \leq 1 < m$) through a video output terminal. The driving signal generation circuit/video signal generation circuit 12 interprets a command out of the command data thus loaded, selects a driving method based on the command, generates signals s1 and s2 for driving and controlling the gate driver/CS driver 14 and a signal s3 for driving and controlling the control signal buffer circuit 15, and outputs the signals s1 and s2 to the gate driver/CS driver 14 and the signal s3 to the control signal buffer circuit 15.

As will be mentioned later, examples of the driving method are a “normal mode” and a “memory mode”. During the normal mode, the driving signal generation circuit/video signal generation circuit 12 output a multiple-tone video signal as a data signal to the output signal line vd(k) and outputs the signal s1 to the gate driver/CS driver 14. During the memory mode, the driving signal generation circuit/video signal generation circuit 12 outputs two-valued data as a data signal to the output signal line vd(k) and outputs the signals s2 and s3 to the gate driver/CS driver 14 and the control signal buffer circuit 15, respectively.

It should be noted that a clock signal that serves as a basis for timing may be inputted from an external system or may be generated by an oscillator or the like inside of the liquid crystal display device 10 or the driving signal generation circuit/video signal generation circuit 12. Further, the driving signal generation circuit/video signal generation circuit 12 can serve also as a circuit that generates not only a timing for use in an memory operation, but also a gate start pulse, a gate clock, a source start pulse, a source clock, etc. for use in a display operation.

The demultiplexer 13 serves to sort outputs from the output signal line vd(k) into the corresponding source line SL(j).

The gate driver/CS driver 14 is a circuit that drives and controls the operation of writing in the pixel memory 20 of the pixel array 11 through the gate line GL(i) and the auxiliary capacitor line CS(i). The gate driver/CS driver 14 controls the gate line GL(i) and the auxiliary capacitor line CS(i) in accordance with the signals s1 and s2 supplied from the driving signal generation circuit/video signal generation circuit 12.

The control signal buffer circuit 15 is a circuit that drives and controls the data-retention operation of the pixel memory 20 of the pixel array 11 through the data transfer control line DT(i) and the refresh output control line RC(i). The control signal buffer circuit 15 controls the data transfer control line DT(i) and the refresh output control line RC(i) in accordance with the signal s3 supplied from the driving signal generation circuit/video signal generation circuit 12.

Further, the liquid crystal display device 10 has its pixel array formed on a substrate (not illustrated). It should be noted that the driving signal generation circuit/video signal generation circuit 12, the demultiplexer 13, the gate driver/CS driver 14, and the control signal buffer circuit 15 may be fabricated monolithically into the substrate.

Furthermore, the liquid crystal display device 10 includes a counter substrate (not illustrated) having a common electrode (counter electrode) COM, with the counter substrate being in such a position as to face the substrate described above. The substrate and the counter substrate are disposed in such a way that liquid crystals are sandwiched between them, and all these components constitute a liquid crystal panel (hybrid memory liquid crystal panel) (display panel).

A common voltage Vcom that is applied to the common electrode COM may be supplied, for example, from a Vcom driver or the like provided in the liquid crystal display device 10, may be supplied from a power source provided inside of the driving signal generation circuit/video signal generation circuit 12, or may be driven directly from outside of the liquid crystal display device 10. However, the common electrode COM may be on the same substrate as the substrate described above.

The pixel electrode of each of the pixel memories 20 forms a liquid crystal capacitor C1*c* with the common electrode COM with liquid crystals sandwiched therebetween. An image is displayed by applying, to the liquid crystal capacitor C1*c*, a voltage corresponding to a potential difference between the pixel electrode and the common electrode COM.

As will be appreciated from the foregoing description, the driving signal generation circuit/video signal generation circuit 12 and the demultiplexer 13 constitute a column driver. Further, the gate driver/CS driver 14 and the control signal buffer circuit 15 constitute a row driver. However, the control signal buffer circuit 15 and a type of CS driver that drives all of these auxiliary capacitor lines CS(i) at the same time may constitute a column driver or may be driven from outside of the liquid crystal display device 10.

In the following, the gate line GL(i), the auxiliary capacitor line CS(i), the data transfer control line DT(i), the refresh output control line RC(i), and the source line SL(i) are sometimes referred to generically as “gate line GL”, “auxiliary capacitor line CS”, “data transfer control line DT”, “refresh output control line RC”, and “source line SL”, respectively.

Figure 2:
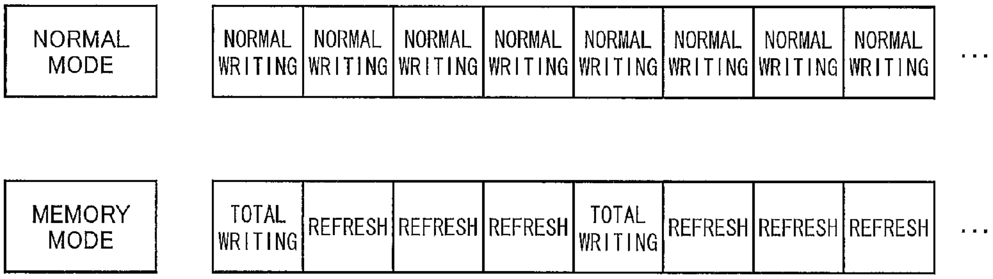
FIG. 2 shows types of driving method that the liquid crystal display device has.

As shown in FIG. 2, the liquid crystal display device 10 thus configured has a “normal mode” and a “memory mode” as a driving method for displaying an image. FIG. 2 shows types of driving method that the liquid crystal display device 10 has.

During the normal mode, such AC driving is carried out that a moving or still image is displayed with multiple tones in accordance with a multiple-tone video signal that is supplied for each frame. During the normal mode, a normal writing period, corresponding to one frame period, in which the multiple-tone signal is written is repeated.

Figure 3:
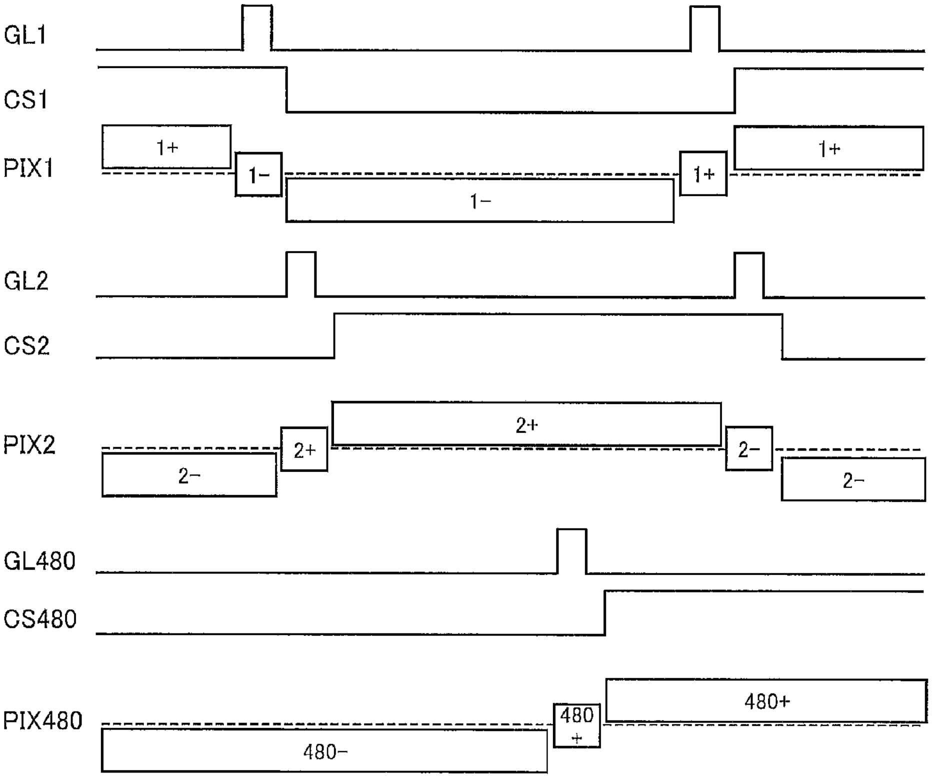
FIG. 3 is a timing chart showing waveforms of various signals during a normal mode in the liquid crystal display device.

FIG. 3 is a timing chart showing waveforms of various signals during the normal mode in the liquid crystal display device 10. The timing chart of FIG. 3 assumes a case where the pixel memories 20 are arranged in a matrix of 480 rows and m columns (n=480); however, for convenience of illustration, the timing chart of FIG. 3 shows signal waveforms of the elements in the 1st, 2nd and 480th rows. GL1, GL2, and GL480 indicate the potentials of the gate lines GL in the 1st, 2nd, and 480th rows, respectively. CS1, CS2, and CS480 indicate the potentials of the auxiliary capacitor lines CS in the 1st, 2nd, and 480th rows, respectively. PIX1, PIX2, and PIX480 indicate the potentials of the pixel electrodes of the pixel memories 20 in the 1st, 2nd, and 480th rows, respectively. Further, the dotted lines overlapped with the signal waveforms of PIX1, PIX2, and PIX480 indicate the potential of the common electrode COM.

During the normal writing period, the multiple-tone video signal outputted to the source lines SL all at once is written line-sequentially to a single row of pixel memories 20 selected by scanning of the gate lines GL. FIG. 3 shows a case where sequential selections are made with the 1st row as a starting row and the 480th row as an ending row. Further, during the normal writing period, writing is performed on the pixel memories 20 by 1 H (1 horizontal period) driving. In addition, CC (charge coupling) driving is carried out, so that the potential of the common electrode COM is held constant and the potentials of the auxiliary capacitor lines CS are inverted between a High potential and a Low potential in accordance with the timing of writing of data to their respective pixel memories 20.

It should be noted that during the normal mode, the data-retention operation in the pixel memories 20 is not carried out. Therefore, by using the control signal buffer circuit 15 to prevent the potentials of the data transfer control lines DT and the potentials of the refresh output control lines RC from affecting the pixel electrodes and the liquid crystal capacitors C1*c*, the liquid crystal display device 10 can fulfill the same functions as those of a liquid crystal display device that does not have a memory function.

During the memory mode, such AC driving is carried out that an image, such as a still image, which does not change much over time is displayed with brightness and darkness (white and black) on the basis of two-valued data retained as a result of the data-retention operation of the pixel memories 20. The two-valued data is data (data signal) that takes on either a High potential or a Low potential. During the memory mode, there are provided a total writing period and a refresh period. The total writing period is a period in which data to be retained in every pixel memory 20 is written for each row. The refresh period is a period in which the data written during the total writing period is retained by refreshing it all at once.

Figure 4:
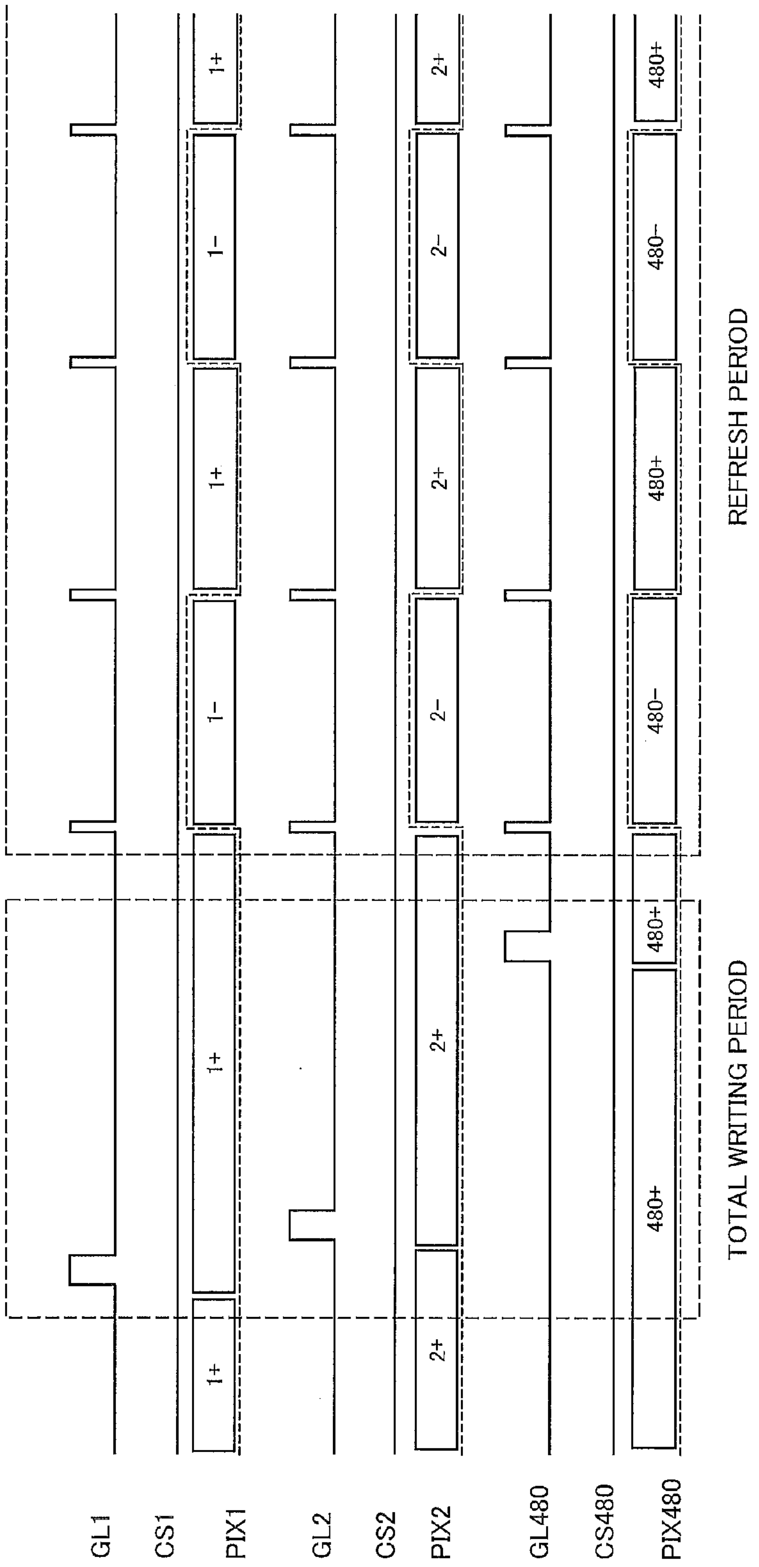
FIG. 4 is a timing chart showing waveforms of various signals during a memory mode in the liquid crystal display device.

FIG. 4 is a timing chart showing waveforms of various signals during the memory mode in the liquid crystal display device 10. The various signals shown in FIG. 4 are the same as those shown in FIG. 3.

During the total writing period, the two-valued data outputted to the source lines SL all at once is written line-sequentially to a single row of pixel memories 20 selected by scanning of the gate lines GL. In the present embodiment, when given data is written to different rows of pixel memories 20, each row that corresponds to a writing address of the pixel array 11 is driven line-sequentially; therefore, the period in which the data is written to one row and that in which the data is written to another row cannot be overlapped. For this reason, during the total writing period, the periods in which the data is written vary from one row to another. FIG. 4 shows a case where sequential selections are made with the 1st row as a starting row and the 480th row as an ending row.

However, during the total writing period, the gate lines GL may be scanned at the same time in different rows, as long as timings of completion of scanning of the gate lines GL are shifted in sequence so that timings of completion of writing of data to the pixel memories 20 vary from one row to another. For example, a method for scanning two gate lines GL every other gate line GL may be used. In the case of this method, while a timing of scanning for one row and that for another row may overlap, the timings of completion of writing of data vary.

Further, during the total writing period, 1 V (1 vertical period) driving is carried out, so that all of the voltages applied to the liquid crystal capacitors C1*c* have the same polarity. During the writing of the data in the pixel electrodes, the potential of the common electrode COM and the potentials of the auxiliary capacitor lines CS are fixed at either a High potential or a Low potential (at a Low potential in FIG. 4).

The refresh period starts concurrently in each pixel memory 20 after completion of writing of data in every pixel memory 20 during the total writing period. That is, a refresh operation is performed on every pixel memory 20 simultaneously. During the refresh period, the data written to the pixel memories 20 during the total writing period is refreshed at least once, whereby the potential level is inverted (High→Low, Low→High). The potential of the common electrode COM is inverted between a High potential and a Low potential as the data is refreshed. The potentials of the auxiliary capacitor lines CS are fixed at Low.

It should be noted that during the memory mode, the refresh period may be repeated any number of times. For example, in an example where there are provided refresh periods as shown in FIG. 2, the number of times writing is carried out within a predetermined period during the memory mode is ¼ as compared to that during the normal mode.

Further, since the two-valued data is written to the pixel memories 20 during the memory mode, the resulting display is a black and white display when the pixel memories 20 are not assigned colors; however, when the pixel memories 20 are assigned colors by a color filter or the like, the number of colors of the resulting display is the number obtained by increasing 2 to the power of the number of pixels for each separate color. For example, in a case where each pixel is constituted by a plurality of pixel electrodes assigned R (red), G (green), and B (blue), respectively, the number of colors of the resulting display is 8 because the number obtained by increasing 2 to the power of 3 is 8.

One of those points which are worth noting here is the data-retention operation of the pixel memories 20 during the memory mode. Accordingly, the concept of the data-retention operation in the pixel memories 20 is explained below, and then the configuration and data-retention operation of the pixel memories 20 are specifically explained. It should be noted that for convenience of explanation, only one of the pixel memories 20 on the pixel array 11 is illustrated; however, the pixel memories 20 have identical functions.

Figure 5:
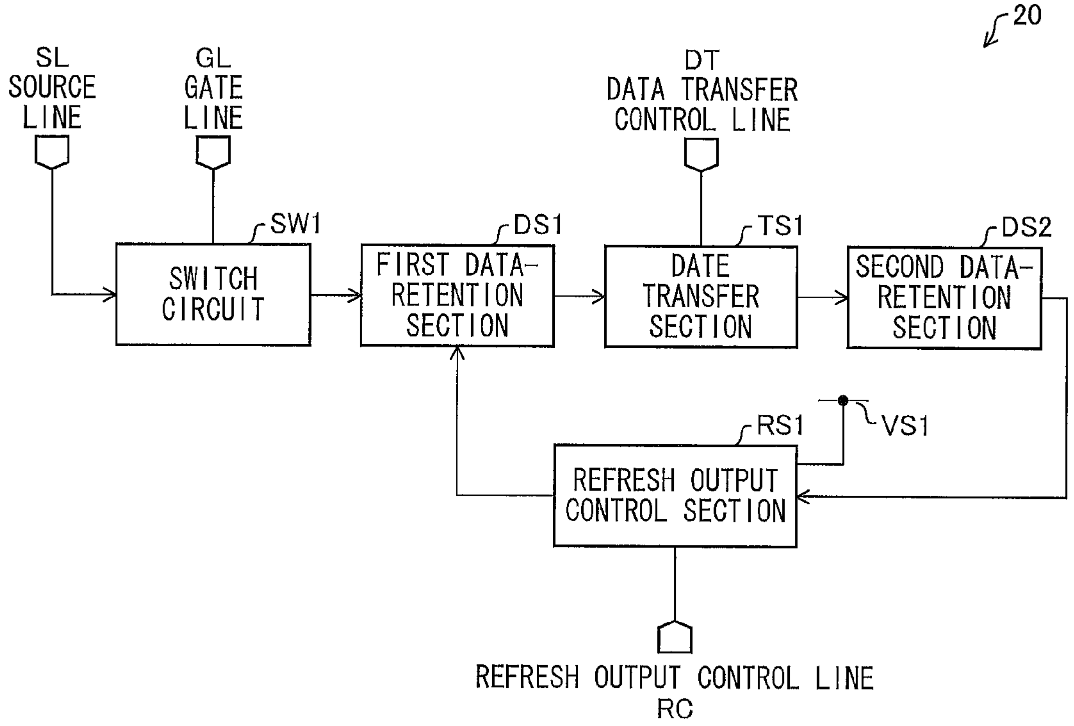
FIG. 5 is a block diagram showing a conceptual configuration of each pixel memory in the liquid crystal display device.

FIG. 5 shows a conceptual configuration of a pixel memory 20. As shown in FIG. 5, the pixel memory 20 includes a switch circuit SW1, a first data-retention section DS1, a data transfer section TS1, as second data-retention section DS2, a refresh output control section TS1, and a supply source VS1 (potential supply source).

The switch circuit SW1 selectively makes conduction and cutoff between the source line SL and the first data-retention section DS1 by being driven by the data driver/CS driver 14 through the gate line GL.

The first data-retention section DS1 retains two-valued data inputted to the first data-retention section DS1.

By being driven by the control signal buffer circuit 15 through the data transfer control line DT, the data transfer section TS1 selectively carries out a transfer operation in which the two-valued data retained in the first data-retention section DS1 is transferred to the second data-retention section DS2 while remaining retained in the first data-retention section DS1 or a nontransfer operation in which such a transfer operation is not carried out. Since the potential that is supplied to the data transfer control line DT is common to all pixel memories 20, the data transfer control line DT does not necessarily need be provided for each row or driven by the control signal buffer circuit 15, but may be driven by the gate driver/CS driver 14 or the like.

The second data-retention section DS2 retains the two-valued data inputted to the second data-retention section DS2.

By being driven by the control signal buffer circuit 15 through the refresh output control line RC, the refresh output control section RS1 is selectively controlled to be in such a state as to carry out a first operation or in such a state as to carry out a second operation. Since the potential that is supplied to the refresh output control section RS1 is common to all pixel memories 20, the refresh output control line RC does not necessarily need be provided for each row or driven by the control signal buffer circuit 15, but may be driven by the gate driver/CS driver 14 or the like.

The first operation is an operation of, in accordance with control information indicating whether the two-valued data retained in the second data-retention section DS2 is a High potential or a Low potential, selecting between an active state in which the input to the refresh output control section RS1 is loaded to be supplied to the first data-retention section DS1 as an output from the refresh output control section RS1 and a nonactive state in which the output from the refresh output control section DS1 is suspended. The second operation is an operation of suspending the output from the refresh output control section RS1 regardless of the control information.

The supply source VS1 supplies a set potential to an input of the refresh output control section RS1.

Figure 6:
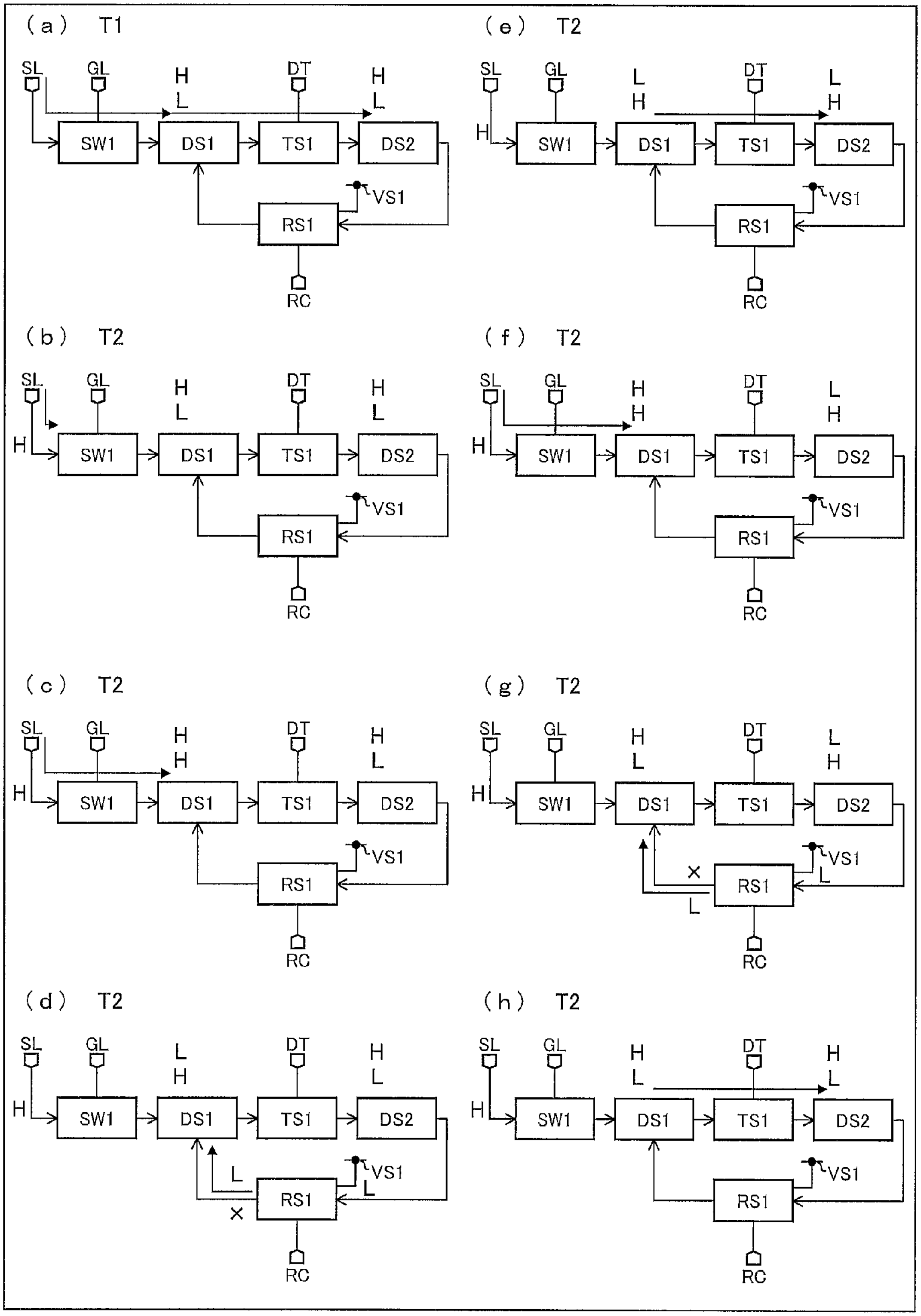
FIG. 6 shows a data-retention operation during the memory mode in the pixel memory, (*a*) showing a transition of data during a total writing period, (*b*) through (*h*) showing transitions of data during a refresh period.

FIG. 6 shows a data-retention operation in the pixel memory 20 during the memory mode, (*a*) showing a transition of data during a total writing period T1, (*b*) through (*h*) showing transitions of data during a refresh period T2. In FIG. 6, the reference sign "H" indicates a High potential (first potential), and the reference sign "L" indicates a Low potential (second potential). Further, in a part where the reference signs "H" and "L" are written with one above the other, the upper column indicates a state of transition of potential in a case where "H" is written to the pixel memory 20, and the lower column indicates a state of transition of potential in a case where "L" is written to the pixel memory 20.

The memory mode begins with the total writing period T1.

During the total writing period T1, as shown in (*a*) of FIG. 6, the gate line GL causes the switch circuit SW1 to be in an ON state, whereby data to be retained that is represented by either the first or second potential is inputted to the first data-retention section DS1 from the source line SL through the switch circuit SW1.

When the data has been inputted to the first data-retention section DS1, the gate line GL causes the switch circuit SW1 to be in an OFF state. Further, at this point in time, the data transfer control line DT causes the data transfer section TS1 to be in an ON state, i.e., in such a state as to carry out the transfer operation, whereby the data inputted to the first data-retention section DS1 is transferred to the second data-retention section DS2 from the first data-retention section DS1 through the data transfer section TS1 while remaining retained in the first data-retention section DS1. When the data has been transferred to the second data-retention section DS2, the data transfer section TS1 comes into an OFF state, i.e., into such a state as to carry out the nontransfer operation.

Next, after the total writing period T1, the refresh period T2 starts.

During the refresh period T2, first, as shown in (*b*) of FIG. 6, the first potential data is outputted in advance to the source line SL.

Then, as shown in (*c*) of FIG. 6, the gate line GL causes the switch circuit SW1 to be in an ON state, whereby the first potential data is inputted to the first data-retention section DS1 from the source line SL through the switch circuit SW1. When the first potential data has been inputted to the first data-retention section DS1, the gate line GL causes the switch circuit SW1 to be in an OFF state.

Then, as shown in (*d*) of FIG. 6, the refresh output control section RS1 is controlled by the refresh output control line RC to be in such a state as to carry out the first operation. The first operation of the refresh output control section RS1 varies depending on the control information, which indicates whether the first or second potential data is retained in the second data-retention section DS2 at this point in time.

That is, in a case where the first potential data is retained in the second data-retention section DS2, first control information indicating that the first potential data is retained in the second data-retention section DS2 is transmitted from the second data-retention section DS2 to the refresh output control section RS1. This causes the refresh output control section RS1 to be in an active state to carry out an operation in which the input to the refresh output control section RS1 is loaded to be supplied to the first data-retention section DS1 as an output from the refresh output control section RS1.

When the refresh output control section RS1 carries out the first operation, the supply source VS1 has its potential set so that the second potential data can be supplied to the input of the refresh output control section RS1 at least finally during a period in which the first control information is being transmitted to the refresh output control section RS1. In this case, the first data-retention section DS1 retains the second potential data supplied from the refresh output control section RS1, in such a state that the second potential data is written over the data retained until then.

Meanwhile, in a case where the second potential data is retained in the second data-retention section DS2, second control information indicating that the second potential data is retained in the second data-retention section DS2 is transmitted from the second data-retention section DS2 to the refresh output control section RS1. This causes the refresh output control section RS1 to be in a nonactive state in which the output is under suspension (as indicated by "x" in (*d*) of FIG. 6). In this case, the first data-retention section DS1 continues to retain the first potential data, which has been retained in the first data-retention section DS1 until then.

After that, the refresh output control line RC causes the refresh output control section RS1 to be in such a state as to carry out the second operation.

During the refresh period T2, then, as shown in (*e*) of FIG. 6, the data transfer control line DT causes the data transfer section TS1 to be in such a state as to carry out the transfer operation, whereby the data retained in the first data-retention section DS1 until then is transferred from the first data-retention section DS1 to the second data-retention section DS2 through the data transfer section TS1 while remaining retained in the first data-retention section DS1. When the data has been transferred from the first data-retention section DS1 to the second data-retention section DS2, the data transfer section TS1 comes into an OFF state, i.e., into such a state as to carry out the nontransfer operation.

Then, as shown in (*f*) of FIG. 6, the gate line GL causes the switch circuit SW1 to be in an ON state, whereby the first potential data is inputted to the first data-retention section DS1 from the source line SL through the switch circuit SW1. When the first potential data has been inputted to the first data-retention section DS1, the gate line GL causes the switch circuit SW1 to be in an OFF state.

Then, as shown in (*g*) of FIG. 6 the refresh output control section RS1 is controlled by the refresh output control line RC to be in such a state as to carry out the first operation. In a case where the first potential data is retained in the second data-retention section DS2, the refresh output control section RS1 comes into an active state to carry out an operation in which the second potential data supplied from the supply source VS1 is supplied to the first data-retention section DS1.

In this case, the first data-retention section DS1 retains the second potential data supplied from the refresh output control section RS1, in such a state that the second potential data is written over the data retained until then. Meanwhile, in a case where the second potential data is retained in the second data-retention section DS2, the refresh output control section RS1 comes into a nonactive state in which the output is under suspension. In this case, the first data-retention section DS1 continues to retain the first potential data, which has been retained in the first data-retention section DS1 until then. After that, the refresh output control line RC causes the refresh output control section RS1 to be in such a state as to carry out the second operation, in which the output is under suspension.

Then, as shown in (*h*) of FIG. 6, the data transfer control line DT causes the data transfer section TS1 to be in such a state as to carry out the transfer operation, whereby the data retained in the first data-retention section DS1 until then is transferred from the first data-retention section DS1 to the second data-retention section DS2 through the data transfer section TS1 while remaining retained in the first data-retention section DS1. When the data has been transferred from the first data-retention section DS1 to the second data-retention section DS2, the data transfer section TS1 comes into an OFF state, i.e., into such a state as to carry out the nontransfer operation.

As a result of the series of operations above, the data written during the total writing period T1 of (*a*) of FIG. 6 is restored in the first and second data-retention sections DS1 and DS2 in (*h*) of FIG. 6. Therefore, no matter how many times the operations from (*b*) through (*h*) of FIG. 6 are repeated after (*h*) of FIG. 6, the data written during the total writing period T1 is similarly restored.

In a case where the first potential data (which is "H" here) has been written during the total writing period T 1, the first potential data is restored to by inverting it once in (*d*) and (*f*) of FIG. 6 each and thereby refreshing it. Meanwhile, in a case where the second potential data (which is "L" here) has been written during the total writing period T1, the second potential data is restored to by inverting it once in (*c*) and (*g*) of FIG. 6 each and thereby refreshing it.

Therefore, during the memory mode, a still image can be displayed while refreshing the screen with retained data. It should be noted that in a case where the first potential is Low and the second potential is High, it is only necessary to invert the aforementioned logic of operation.

Further, during the refresh, the first potential data is supplied to the first data-retention section DS1 from the source line SL as shown in (*c*) and (*f*) of FIG. 6, and the refresh output control section RS1 supplies the second potential data from the supply source VS1 to the first data-retention section DS1 as shown in (*d*) and (*g*) of FIG. 6. This makes it unnecessary to provide an inverter to carry out a refresh operation, as has conventionally been the case.

That is, the liquid crystal display device 10 makes it possible that by supplying either the first or second potential data through the source line SL and supplying the other potential data from the supply source VS1 without use of an inverter after writing data to the first data-retention section DS1 in each pixel memory 20, the data written to the pixel memory 20 is refreshed while inverting the potential level.

Moreover, since, in a refreshed state, the first data-retention section DS1 and the second data-retention section DS2 are equal in data to each other, there is no change in potential between the first data-retention section DS1 and the second data-retention section DS2 even when the data transfer section TS1 carries out the transfer operation. This makes it possible to retain the refreshed data both in the first data-retention section DS1 and the second data-retention section DS2 over a prolonged period of time with the data transfer section TS1 put in such a state as to carry out the transfer operation. Since, at this point in time, the first data-retention section DS1 and the second data-retention section DS2 are connected to each other through the data transfer section TS1, the presence of an off-leakage current in the transfer element of the data transfer section TS1 is no longer of relevance to the retention of the data. Further, the data becomes retained in a large capacitance represented by the sum of the first data-retention section DS1 and the second data-retention section DS2 as a whole, so that the data is unlikely to change in potential even under the influence of external noise.

Figure 12:
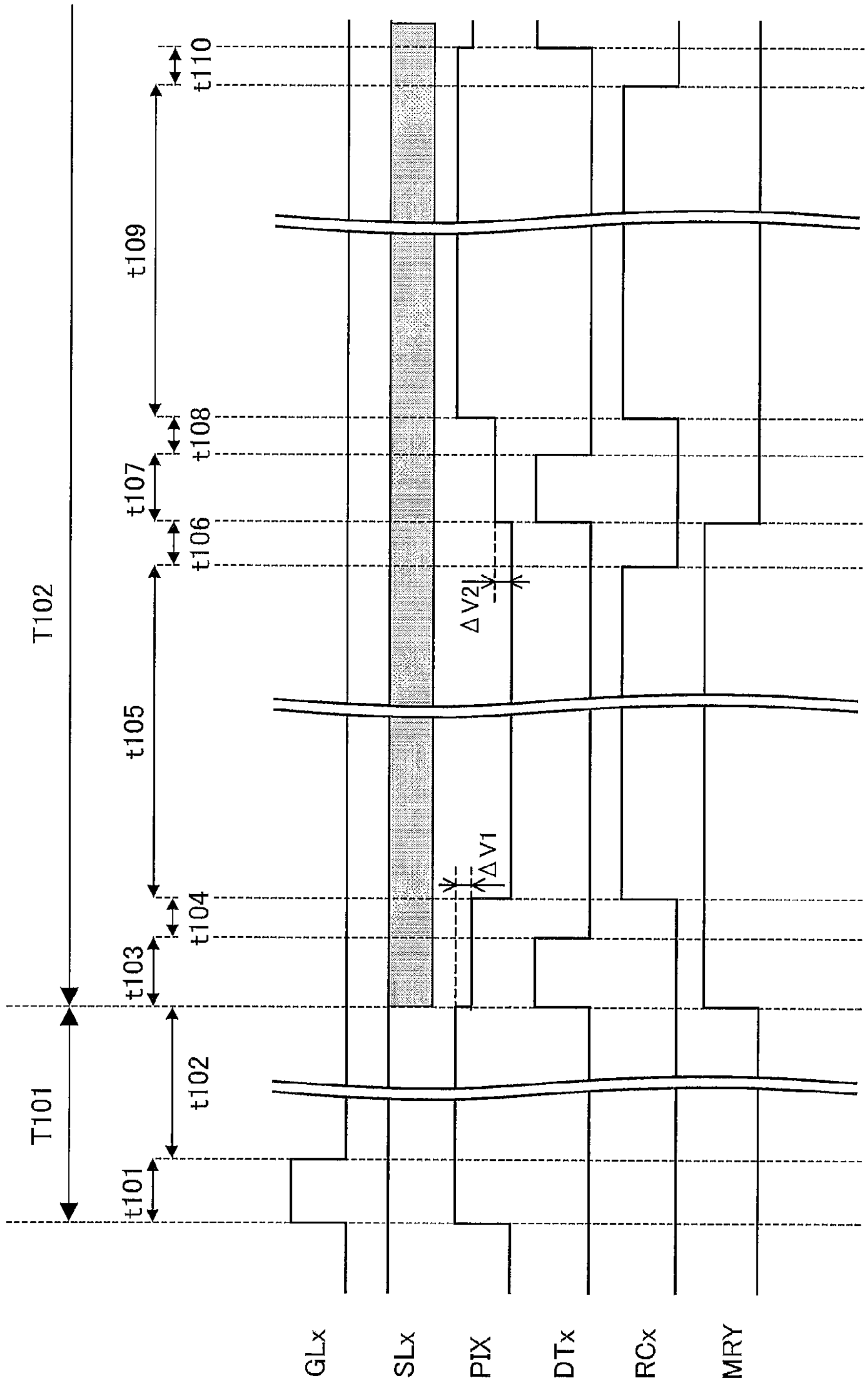
FIG. 12 is a timing chart showing waveforms of various signals during a memory mode in the conventional pixel memory.

Therefore, even in the presence of an off-leakage current in the transfer element used in the data transfer section TS1, the potential of a retention node retaining the data of the second data-retention section DS2 is unlikely to change, because it is retained over a prolonged period of time together with the potential of a retention node of the first data-retention section DS1. In a conventional pixel memory, an off-leakage current in the transfer element would greatly affect the potential of the second data-retention section DS2, because in a refreshed state during the periods t105 and t109 shown in FIG. 12, the first data-retention section DS1 and the second data-retention section DS2 retain different data from each other over a prolonged period of time with the first data-retention section DS1 and the second data-retention section DS2 electrically disconnected by the transfer element (transistor N 101) of the data transfer section TS1.

Further, even if the potential of the retention node of the second data-retention section DS2 changes, it would not change over such a prolonged period of time that the control information to the refresh output control section RS1 carrying out the first operation switches between an active level and a nonactive level.

Further, even if an inverter exists in the refresh output control section RS1, there would exit two complementary levels, i.e., High and Low levels, each of which serves as an active level at which the inverter operates; therefore, the range of levels at which the potential of the second data-retention section DS2 allows the inverter to stably maintain the same operation is narrow. For example, when the inverter is made to operate so that the potential of the second data-retention section DS2 is at a Low level, that the P-channel transistor is in an ON state, and that the N-channel transistor is in an OFF state, a slight rise in gate potential of the P-channel transistor poses a risk of the N-channel transistor becoming conductive. However, an attempt to avoid such a situation by designing the N-channel transistor to have a large threshold voltage causes the range within which the High level serves as the active level to be narrow when the inverter needs to operate so that the N-channel transistor is in an ON state.

On the other hand, the active level of the refresh output control section RS1 in the present embodiment is either the first or second potential; therefore, by providing a wide range within which the control information to the refresh output control section RS1 exists as the nonactive level, the risk of a change from the nonactive level to the active level is reduced. Meanwhile, if the active level functions in the early stage of an active state in the first operation of the refresh output control section RS1, the purpose of the output from the supply source V1 to the first data-retention section DS1 is easily achieved; therefore, even if there finally occurs a change to the nonactive level, a malfunction in the refresh output control section RS1 is unlikely to be invited.

This make it possible to easily create a design with such a large margin that a malfunction does not occur in the refresh output control section RS1 even if the potential of the retention node of the second data-retention section DS2 changes. When taking, as an example, a case where the control information to the refresh output control section RS1 is inputted to the gate of a transistor, this is equivalent to raising the threshold voltage of the transistor to create such a design that the gate-source voltage is unlikely to exceed the threshold voltage of the transistor even if the potential of the second data-retention section DS2, which is supposed to be at the nonactive level, changes.

Further, even if the potential of the retention node of the second data-retention section DS2 changes, no malfunction occurs as long as the refresh output control section RS1 carries out the second operation.

Therefore, even in the presence of an off-leakage current in the transfer element used in the transfer section that transfers two-valued data between the two retention sections, a circuit that carries out a refresh operation in accordance with data retained in one of the retention sections can be made to appropriately carry out the operation that it is supposed to carry out without an increase in consumption current or a malfunction.

Next, the configuration and data-retention operation of the pixel memories 20 are specifically explained in sequence with reference to the embodiment.

Figure 7:
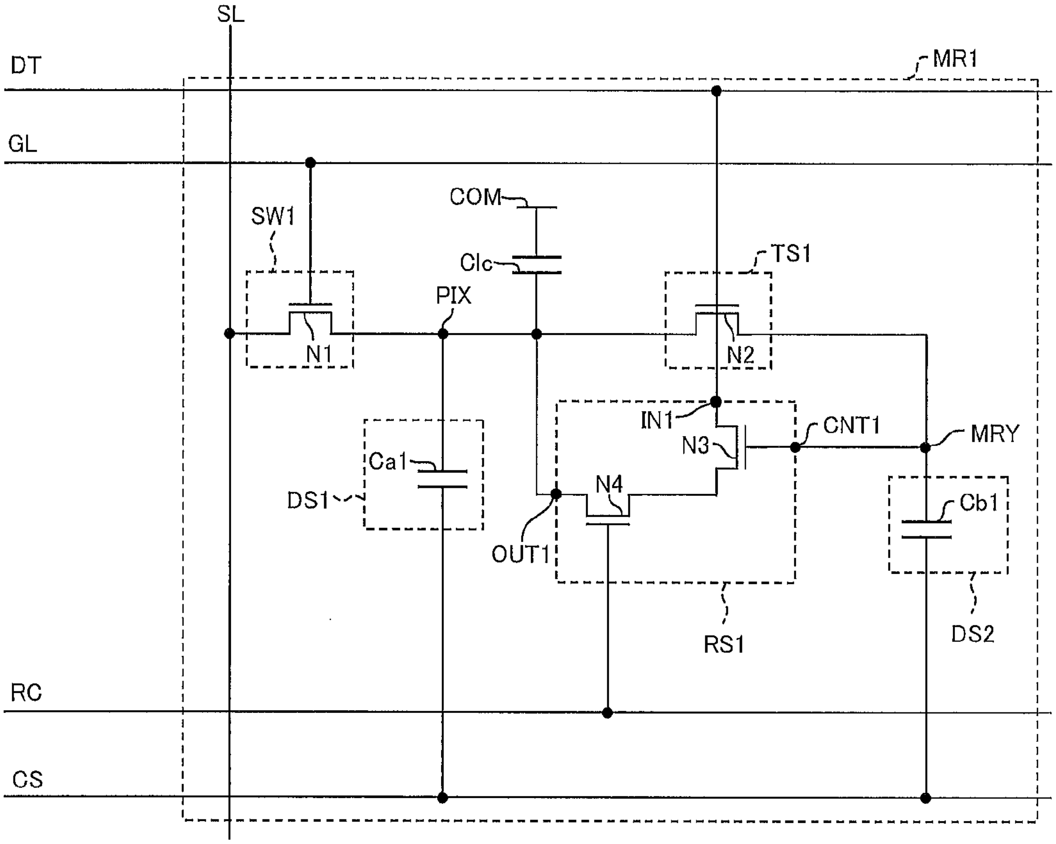
FIG. 7 is an equivalent circuit diagram showing an example of an electric configuration of the pixel memory.

FIG. 7 shows an example of a configuration of each of the pixel memories 20 of the present embodiment with a memory circuit MR1 serving as an equivalent circuit. As shown in FIG. 7, the memory circuit MR1 includes a transistor N1, a transistor N2, a transistor N3 (first switch), a transistor N4 (second switch), a capacitor Ca1 (first capacitor), and a capacitor Cb1 (second capacitor).

Further, the pixel array 11 is provided with a source line SL, a gate line GL, an auxiliary capacitor line CS, a data transfer control line DT, and a refresh output control line RC, all of which serve as wires to drive the memory circuit MR1.

It should be noted that the components shown in FIG. 5 correspond their counterparts in the memory circuit MR1 shown in FIG. 7, respectively, as follows: the transistor N1 constitutes the switch circuit SW1; the capacitor Ca1 constitutes the first data-retention section DS1; the transistor N2 serves as the transfer element to constitute the data transfer section TS1; the capacitor Cb1 constitutes the second data-retention section DS2; and the transistors N3 and N4 constitute the refresh output control section RS1. Therefore, the memory circuit MR1 can of course be said to include a switch circuit SW1 (first switch circuit), a first data-retention section DS1, a data transfer section TS1 (second switch circuit), a second data-retention section DS2, and a refresh output control section RS1 (control section, third switch circuit).

The transistors N1 to N4 are N-channel TFTs (field-effect transistors), whereby all of the transistors constituting the memory circuit MR1 in FIG. 7 are N-channel transistors. Therefore, the memory circuit MR1 can also be easily fabricated into amorphous silicon.

Let it be assumed here that such a field-effect transistor as the TFTs named above has two drain/source terminals one of which is called a first drain/source terminal and the other one of which is called a second drain/source terminal.

The transistor N1 has its gate terminal connected to the gate line GL, its first drain/source terminal connected to the source line SL, and its second drain/source terminal connected to a node PIX, which is an end of the capacitor Ca1, with the other end of the capacitor Ca1 connected to the auxiliary capacitor line CS. When the transistor N1 is in an ON state, the switch circuit SW is in a conductive state, and when the transistor N1 is in an OFF state, the switch circuit SW is in a cutoff state.

The transistor N2 has its gate terminal connected to the data transfer control line DT, its first drain/source terminal connected to the node PIX, and its second drain/source terminal connected to a node MRY, which is an end of the capacitor Cb1, with the other end of the capacitor Cb1 connected to the auxiliary capacitor line CS. When the transistor N2 is in an ON state, the data transfer section TS1 is in such a state as to carry out the transfer operation, and when the transistor N2 is in an OFF state, the data transfer section TS1 is in such a state as to carry out the nontransfer operation. In other words, when the transistor N2 is in an ON state, the node PIX and the node MRY are in a conductive state with each other, and when the transistor N2 is in an OFF state, the node PIX and the node MRY are in a cutoff state from each other.

The transistor N3 has its gate terminal connected to the node MRY to serve as a control terminal CNT1 of the refresh output control section RS1, its first drain/source terminal connected to the data transfer control line DT to serve as an input terminal IN of the refresh output control section RS1, and its second drain/source terminal connected to the first drain/source terminal of the transistor N4. The transistor N3 uses the potential retained in the node MRY as a control signal for conduction or cutoff.

The transistor N4 has its gate terminal connected to the refresh output control line RC and its second drain/source terminal connected to the node PIX to serve as an output terminal OUT1 of the refresh output control section RS1. That is, the transistor N3 and the transistor N4 are connected in series to each other between an input of the refresh output control section RS1 and an output of the refresh output control section RS1 so that the transistor N3 is placed toward the input of the refresh output control section RS1. The transistor N4 uses the potential of the refresh output control line RC as a control signal for conduction or cutoff.

It should be noted that the transistor N3 and the transistor N4 may be connected in such a way as to have their places swapped. The transistor N3 and the transistor N4 need only be connected in series with each other between the input of the refresh output control section RS1 and the output of the refresh output control section RS1.

When the transistor N4 is in an ON state, the refresh output control section RS1 is controlled to be in such a state as to carry out the first operation, and when the transistor N4 is in an OFF state, the refresh output control section RS1 is controlled to be in such a state as to carry out the second operation. Since the transistor N3 is an N-channel transistor, when the refresh output control section RS1 carries out the first operation, the control information that renders an active state, i.e., the active level is High and the control information that renders a nonactive state, i.e., the nonactive level is Low. In other words, when the transistors N3 and N4 are in an ON state, the node PIX and the data transfer control line DT are in a conductive state with each other, and when the transistors N3 and N4 are in an OFF state, the node PIX and the data transfer control line DT are in a cutoff state from each other.

The capacitor Ca1 has a larger capacitance value than the capacitor Cb1. For example, the capacitor Ca1 and the capacitor Cb1 have their respective capacitances set so that when there occurs a charge transfer between the capacitor Ca1 and the capacitor Cb1 as will be described later, a change in potential of the node PIX (pixel electrode) does not affect the potential (High potential and Low potential) of the data.

Further, the memory circuit CR1 has a liquid crystal capacitor C1*c* connected between the node PIX and the common electrode COM. The node PIX corresponds to a pixel electrode, and the pixel Ca1 serves also as an auxiliary capacitor of the pixel memory 20.

Figure 8:
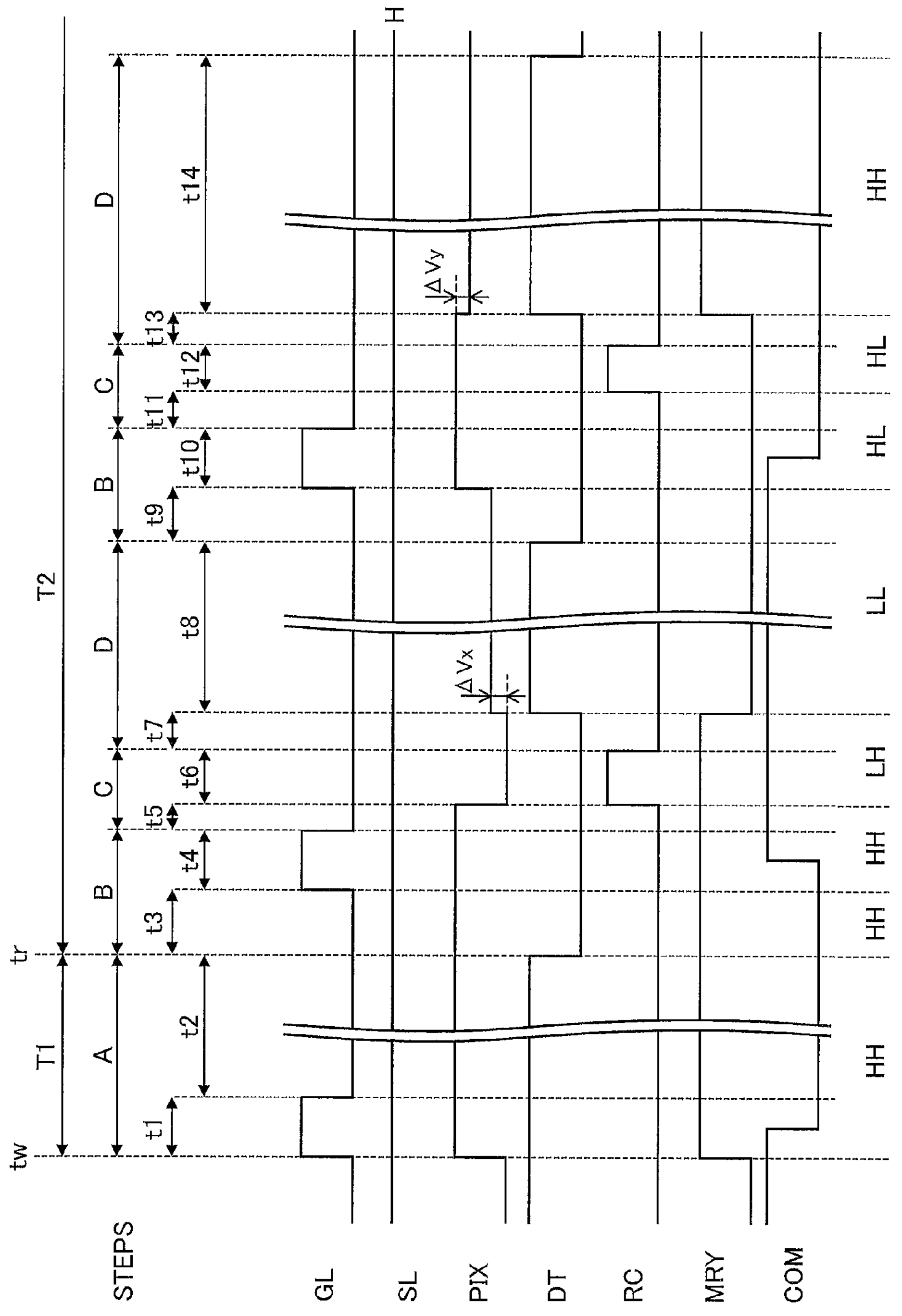
FIG. 8 is a timing chart showing waveforms of various signals during the memory mode in the pixel memory.

FIG. 8 is a timing chart showing waveforms of various signals during the memory mode of the memory circuit MR1 thus configured.

FIG. 8 shows a case where High data is written as first potential data during the total writing period T1. Shown in the lower part of FIG. 8 are the potentials of the node PIX (on the left side) and the potentials of the node MRY (on the right side) during the respective periods corresponding (*a*) through (*h*) of FIG. 6. It should be noted that although FIG. 8 shows signal waveforms of the elements in the first row to be scanned, the signal waveforms during the refresh period T2 occur in common to all rows, because as mentioned above the refresh operation is carried out at the same time in each row.

The data-retention operation is carried out by inputting display data and a data-retention command to the driving signal generation circuit/video signal generation circuit 12 through a transmission line from outside of the liquid crystal display device 10 and interpreting the command to generate a memory code. The driving signal generation circuit/video signal generation circuit 12 generates, in accordance with the display data, two-valued data to be supplied to the pixel array 11 and controls the source line SL through the output signal line vd(k) and the demultiplexer 13. Further, at the same time, the driving signal generation circuit/video signal generation circuit 12 generates signals s2 and s3 in accordance with the memory code and controls the gate driver/CS driver 14 and the control signal buffer circuit 15.

The gate driver/CS driver 14 and the control signal buffer circuit 15 controls the gate line GL, the auxiliary capacitor line CS, the data transfer control line DT, and the refresh output control line RC in accordance with the signals s2 and s3 supplied from the driving signal generation circuit/video signal generation circuit 12.

To the gate line GL, a two-valued level potential consisting of High (active-level) and Low (nonactive-level) levels of potential, is applied from the gate driver/CS driver 14. To the data transfer control line DT and the refresh output control line RC, a two-valued level potential consisting of High and Low is applied from the control signal buffer circuit 15. The High and Low levels of potential may be set for each separate one of the lines. The auxiliary capacitor line CS is fixed at a constant potential by the gate driver/CS driver 14.

To the source line SL, two-valued data (data signal potential) consisting of High, which is lower than High of the gate line GL, and Low is outputted from the demultiplexer 13. The High potential of the data transfer control line DT is equal to either the High potential of the source line SL or the High potential of the gate line GL, and the Low potential of the data transfer control line DT is equal to the Low potential of the two-valued data.

The total writing period T1 consists of a sequence of successive periods t1 and t2.

During the period t1 in the total writing period T1, the gate line GL and the data transfer control line DT both have their potentials raised to High. The potential of the refresh output control line RC is Low. This causes the transistors N1 and N2 to be in an ON state. As a result, the switch circuit SW1 comes into a conductive state, and the data transfer section TS1 comes into such a state as to carry out the transfer operation, whereby first data (which is High here) supplied to the source line SL is written to the node PIX.

Then, during the period t2, the gate line GL has its potential dropped to Low. Meanwhile, the data transfer control line DT has its potential maintained at High. The potential of the refresh output control line RC is Low. This causes the transistor N1 to be in an ON state, whereby the switch circuit SW1 comes into a cutoff state. Further, because the transistor N2 maintains its ON state, the data transfer section TS1 continues to carry out the transfer operation. Accordingly, the first potential data is transferred from the node PIX to the node MRY, and the nodes PIX and MRY are disconnected from the source line SL. This process during the periods t1 and t2 corresponds to the state shown in (*a*) of FIG. 6.

It should be noted that each row has a different start time tw of the period t1 in the total writing period T1. This is because, as mentioned above, the period in which the data is written to one row and that in which the data is written to another row cannot be overlapped by putting the switch circuits SW1 of different rows of memory circuit MR1 in an ON state at the same time. However, in the total writing period T1, the period t1 for one row and that for another row may overlap, provided the period t1 for one row and that for another row are set to end at different timings. Further, the period t2 can be said to be a period in which writing is being performed on another row.

Next, the refresh period T2 starts concurrently at a time tr in every memory circuit MR1. During the refresh period T2, the potential of the source line SL is High, which is the data potential of the first potential data.

The refresh period T2 consists of a sequence of successive periods t3 to t14.

During the period t3 in the refresh period T2, the gate line GL, the data transfer control line DT, and the refresh output control line RC have their potentials dropped to Low. This causes the transistor N2 to be in an OFF state. As a result, the data transfer section TS1 comes into such a state as to carry out the nontransfer operation, whereby the node PIX and the node MRY are disconnected from each other. The node PIX and the node MRY are both held High. This process during the period t3 corresponds to the state shown in (*b*) of FIG. 6.

Then, during the period t4, the gate line GL has its potential raised to High, while the data transfer control line DT and the refresh output control line RC have their potentials maintained at Low. This causes the transistor N1 to be in an ON state. As a result, the switch circuit SW1 comes into a conductive state, whereby the High potential is written again from the source line SL into the node PIX.

During the period t5, the gate line GL has its potential dropped to Low, while the data transfer control line DT and the refresh output control line RC have their potentials maintained at Low. This causes the transistor N1 to be in an OFF state. As a result, the switch circuit SW1 comes into a cutoff state, whereby the node PIX is disconnected from the source line SL to be held High. This process during the periods t4 and t5 corresponds to the state shown in (c) of FIG. 6.

During the period t6, the gate line GL and the data transfer control line DT have their potentials maintained at Low, while the refresh output control line RC has its potential raised to High. This causes the transistor N4 to be in an ON state, whereby the refresh output control section RS1 carries out the first operation. Further, since the potential of the node MRY is High, the transistor N3 is in an ON state. Therefore, the refresh output control section RS1 comes into an active state, whereby the Low potential is supplied from the data transfer control line DT to the node PIX through the transistors N3 and N4. That is, the data transfer control line DT serves also as the supply source VS1 of FIG. 5.

During the period t7, the gate line GL and the data transfer control line DT have their potentials maintained at Low, while the refresh output control line RC has its potential dropped to Low. This causes the transistor N4 to be in an OFF state. As a result, the refresh output control section RS1 comes into such a state as to carry out the second operation, whereby the node PIX is disconnected from the data transfer control line DT to be held Low. This process during the periods t6 and t7 corresponds to the state shown in (*d*) of FIG. 6.

During the period t8, the gate line GL and the refresh output control line RC have their potentials maintained at Low, while the data transfer control line DT has its potential raised to High. This causes the transistor N2 to be in an ON state, whereby the data transfer section TS1 comes into such a state as to carry out the transfer operation. At this point in time, there occurs a charge transfer between the capacitor Ca1 and the capacitor Cb1, whereby the node PIX and the node MRY both become Low in potential. The potential of the node PIX remains within a Low potential range, although it slightly rises by a voltage ΔVx due to the transfer of positive charge from the capacitor Cb1 to the capacitor Ca1 through the transistor N2.

The period t8 is a period in which the refreshed data is retained both in the first and second data-retention sections DS1 and DS2 connected to each other through the data transfer section TS1, and can be set long.

During the period t9, the gate line GL and the refresh output control line RC have their potentials maintained at Low, while the data transfer control line DT has its potential dropped to Low. This causes the transistor N2 to be in an OFF state. As a result, the data transfer section TS1 comes into such a state as to carry out the nontransfer operation, whereby the node PIX and the node MRY are disconnected from each other. The node PIX and the node MRY are both held Low. This process during the periods t8 and t9 corresponds to the state shown in (*e*) of FIG. 6.

During the period t10, the gate line GL has its potential raised to High, while the data transfer control line DT and the refresh output control line RC have their potentials maintained at Low. This causes the transistor N1 to be in an ON state. As a result, the switch circuit SW1 comes into a conductive state, whereby the High potential is written again from the source line SL into the node PIX.

During the period t11, the gate line GL has its potential dropped to Low, while the data transfer control line DT and the refresh output control line RC have their potentials maintained at Low. This causes the transistor N1 to be in an OFF state. As a result, the switch circuit SW1 comes into a cutoff state, whereby the node PIX is disconnected from the source line SL to be held High. This process during the periods t10 and t11 corresponds to the state shown in (*f*) of FIG. 6.

During the period t12, the gate line GL and the data transfer control line DT have their potentials maintained at Low, while the refresh output control line RC has its potential raised to High. This causes the transistor N4 to be in an ON state, whereby the refresh output control section RS1 comes into such a state as to carry out the first operation. Further, since the potential of the node MRY is Low, the transistor N3 is in an OFF state. Therefore, the refresh output control section RS1 comes into a nonactive state, in which the output is under suspension. Therefore, the node PIX remains held High.

During the period t13, the gate line GL and the data transfer control line DT have their potentials maintained at Low, while the refresh output control line RC has its potential dropped to Low. This causes the transistor N4 to be in an OFF state. As a result, the refresh output control section RS1 comes into such a state as to carry out the second operation, whereby the node PIX is held High. This process during the periods t12 and t13 corresponds to the state shown in (*g*) of FIG. 6.

During the period t14, the gate line GL and the refresh output control line RC have their potentials maintained at Low, while the data transfer control line DT has its potential raised to High. This causes the transistor N2 to be in an ON state, whereby the data transfer section TS1 comes into such a state as to carry out the transfer operation. At this point in time, there occurs a charge transfer between the capacitor Ca1 and the capacitor Cb1, whereby the node PIX and the node MRY both become High in potential. The potential of the node PIX remains within a High potential range, although it slightly falls by a voltage ΔVy due to the transfer of positive charge from the capacitor Ca1 to the capacitor Cb1 through the transistor N2. This process during the period t14 corresponds to the state shown in (*h*) of FIG. 6.

The period t14 is a period in which the refreshed data is retained both in the first and second data-retention sections DS1 and DS2 connected to each other through the data transfer section TS1, and can be set long.

As a result of these operations, the data written during the period t1 in the total writing period T1 is restored in the nodes PIX and MRY during the period t14. The potential of the node PIX is High during the periods t 1 to t5 and the periods t10 to t14, and Low during the periods t6 to t9. The potential of the node MRY is High during the periods t1 to t7 and the period t14, and Low during the periods t8 to t13.

After this, if the refresh period T2 is continued, the driving signal generation circuit/video signal generation circuit 12 repeats the operations from the period t3 to the period t14. Alternatively, if new data is written, the driving signal generation circuit/video signal generation circuit 12 carries out such control that a writing operation is carried out, thus terminating the refresh period T2.

In this way, the liquid crystal display device 10 makes it possible that by supplying the first potential data through the source line SL and supplying the second potential data through the data transfer control line DT without use of an inverter after writing data in the first data-retention section DS1 in each memory circuit MR1, the data written to the pixel memory 20 is refreshed while inverting the level.

It should be noted here that since the absence of AC reversal of the polarity of liquid crystals causes burn-in or deterioration in the liquid crystals, the polarity needs to be reversed while maintaining the absolute value of a voltage to be applied to the liquid crystals, whether in the presence or absence of a voltage that is applied to the liquid crystals. Therefore, the common electrode COM is driven to have its potential reversed between High and Low every time the gate line GL has its potential raised to High and the transistor N1 comes into an ON state. Such reverse AC driving of the common electrode COM between two levels makes it possible to carry out bright and dark displays while carrying out AC driving of the liquid crystal capacitor C1*c* between positive and negative polarities.

Further, assuming, for example, that the High and Low potentials of the potential Vcom of the common electrode COM are equal to the High and Low potentials of the two-valued data, respectively, four patterns of gradation display, namely negative black, negative white, positive white, and positive black, are achieved by satisfying (data, Vcom)=(H, H), (L, H), (H, L), (L, L). Accordingly, every time the potential of the node PIX is refreshed, the liquid crystals are driven so that the direction of the voltage being applied to the liquid crystals is reversed while the display gradation is substantially maintained. This makes possible such AC driving of the liquid crystals that the voltage being applied to the liquid crystals has both its positive and negative effective values held constant.

Further, as exemplified in FIG. 8, the inversion of the potential level of the common electrode COM is carried out only during a period in which the switch circuit SW1 is conductive. According to this, the two levels that are supplied to the common electrode COM are inverted only during a period in which the pixel electrode (node PIX) is connected to the source line SL through the switch circuit SW1; therefore, the common electrode potential is inverted with the pixel electrode potential fixed at the potential of the source line SL. Accordingly, the pixel electrode potential being retained, or, in particular, the pixel electrode potential during the refresh period is free from a such a change as that which would be effected on the node PIX by inversion of the common electrode potential while the node PIX is floating.

It should be noted that the transition of states in the pixel memory 20 as shown in (*a*) through (*h*) of FIG. 6 can be divided into the following steps of operation of the memory circuit MR1 in FIG. 8.

(1) Step a (Which Corresponds to the Periods t1 to t2 (the Total Writing Period T1))

In Step A, with the driving signal generation circuit/video signal generation circuit 12 and the demultiplexer 13 supplying the first or second potential data to the source line SL and with the refresh output control section RS1 carrying out the second operation, the switch circuit SW1 is made conductive, whereby the data is written to the pixel memory 20, and the transfer operation is carried out by the data transfer section TS1 with the data written to the pixel memory 20 and with the refresh output control section RS1 carrying out the second operation.

(2) Step B (Which Corresponds to the Periods t3 to t4 and to the Periods t9 to t11)

In Step B, which follows Step A, the switch circuit SW1 is made conductive with the refresh output control section RS1 carrying out the second operation and with the data transfer section TS1 carrying out the nontransfer operation, whereby data having a potential equal to a level corresponding to the control information that renders the refresh output control section RS1 in an active state is inputted to the data-retention section DS1 through the source line SL.

(3) Step C (Which Corresponds to the Periods t5 to t6 and to the Periods t11 to t12)

In Step C, which follows Step B, the first operation is carried out by the refresh output control section RS1 with the switch circuit SW1 in a cutoff state and with the data transfer section TS1 carrying out the nontransfer operation, and after completion of the first operation, data having an inversion level at the level corresponding to the control information that renders the refresh output control section RS1 in an active state is supplied from the supply source VS1 to the input of the refresh output control section RS1.

(4) Step D (Which Corresponds to the Periods t7 to t8 and to the Periods t13 to t14)

In Step D, which follows Step C, the transfer operation is carried out by the data transfer section TS1 with the switch circuit SW1 in a cutoff state and with the refresh output control section RS1 carrying out the second operation.

Moreover, the operation during the memory mode as a whole is such that Step A is executed first, and then the series of operations from the start of Step B to the end of Step D (periods t3 to t8) are executed at least once.

The foregoing description of the data-retention operation of the memory circuit MR1 with reference to FIG. 8 assumes a case where High as the first potential data is written during the total writing period T1. However, also in a case where Low as the second potential data is written during the total writing period T1, a change in potential occurs in the same way of thinking as in FIG. 8.

Further, the command for the operation during the refresh period T2 in the memory mode may be generated not by an external signal but by a clock internally generated by an oscillator or the like. Doing so makes it unnecessary for an external system to input a refresh command at regular periods, thus brings about the advantage of being capable of building a flexible system.

In the liquid crystal display device 10, as described above, circuits such as amplifiers and data for displaying multiple tones can be suspended by the driving signal generation circuit/video signal generation circuit 12 during the memory mode. This makes it possible to achieve a reduction in power consumption. Further, since the data potential can be refreshed in each pixel memory 20 during the memory mode, it is not necessary to rewrite the data potential while charging and discharging the source line SL for refresh. This also makes it possible to achieve a reduction in power consumption. Furthermore, since the data polarity can be reversed in each pixel memory 20, it is not necessary to rewrite the data polarity while charging and discharging the source line SL during polarity reversal. This also makes it possible to achieve a reduction in power consumption.

Further, since the memory circuits MR1, which serve as memory circuits, have no elements, such as a through current of an inverter for carrying out a refresh operation, which would cause a huge increase in power consumption, the amount of power that is consumed during the memory mode per se can be significantly reduced as compared to the conventional technology.

It should be noted here that in the liquid crystal display device 10 of the present embodiment thus described, too, image noise sometimes may occur when a switch between the normal mode and the memory mode is made.

Figure 9:
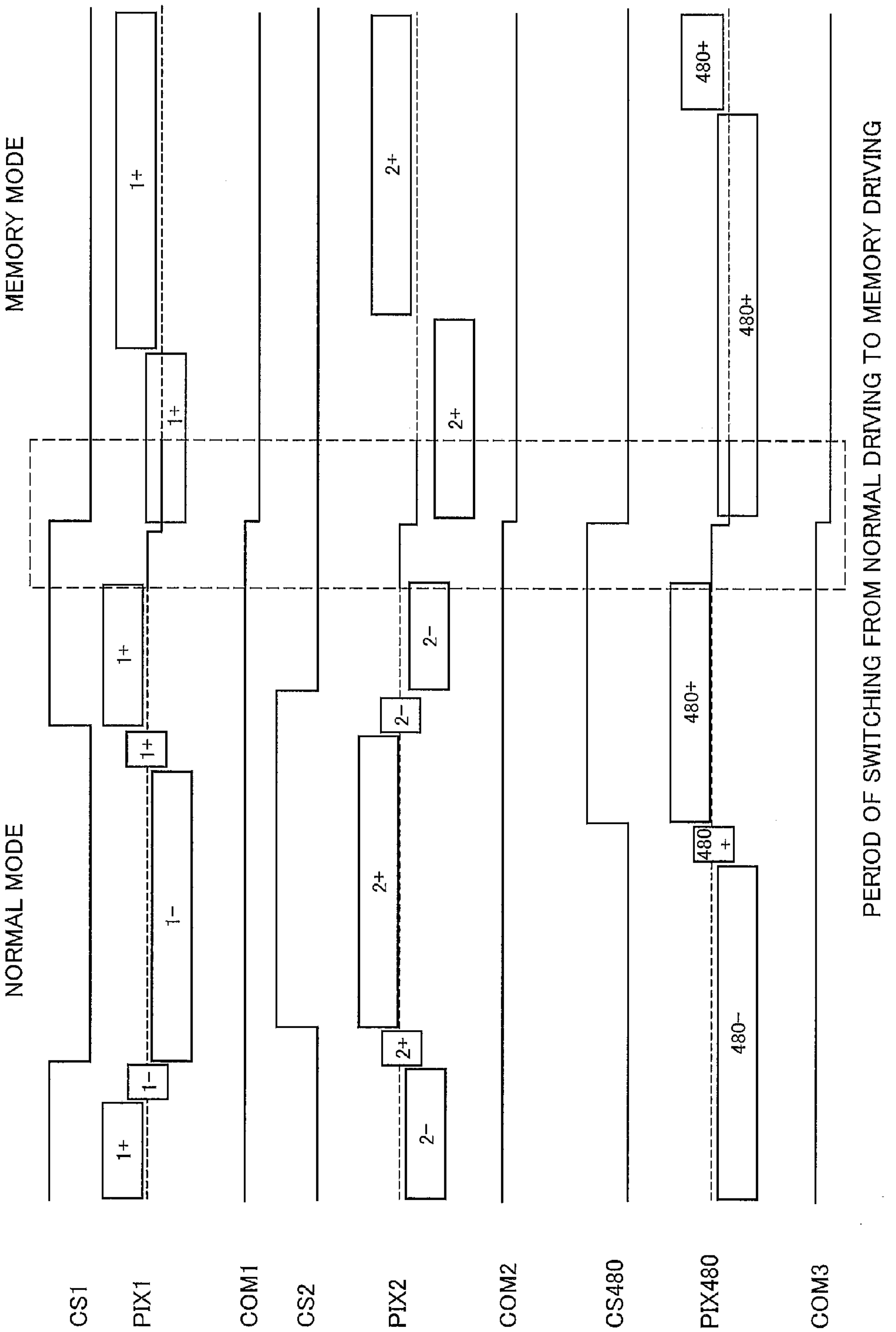
FIG. 9 is a timing chart showing waveforms of various signals in a case where image noise is generated when a switch from the normal mode to the memory mode is made in the liquid crystal display device.

FIG. 9 is a timing chart showing waveforms of various signals in a case where image noise is generated when a switch from the normal mode to the memory mode is made in the liquid crystal display device 10. CS1, CS2, and CS480 indicate the potentials of the auxiliary capacitor lines CS in the 1st, 2nd, and 480th rows, respectively. PIX1, PIX2, and PIX480 indicate the potentials of the pixel electrodes of the memory circuits MR100 in the 1st, 2nd, and 480th rows, respectively. Further, COM1, COM2, and COM480 indicate the potential of the common electrode COM in the 1st, 2nd, and 480th rows, respectively; however, the common electrode has a potential common to all rows.

As mentioned above, since, during the normal mode, CC driving is carried out, the potential of the common electrode COM is held constant, and the potentials of the auxiliary capacitor lines CS are inverted between High and Low in accordance with the timing of writing of data to their respective pixel memories 20.

Meanwhile, during the total writing period of the memory mode, the common electrode COM and the auxiliary capacitor lines CS have their potentials fixed at a predetermined potential (which is Low here). It should be noted that at this point in time, the common electrode COM may have its potential set at a predetermined potential that is different from the potential at which the common electrode COM is set during the normal mode.

Therefore, as shown in FIG. 9, there is a case where the common electrode COM and the auxiliary capacitor lines CS become different in potential between before a shift from the normal mode to the memory mode and after the shift. Since, at this point in time, each memory circuit MR1 has its node PIX in a floating state, the node PIX is suffers from a change due to a change in potential of the auxiliary capacitor line CS (shift to a predetermined potential). Further, since the potential of the common electrode COM, which serves a reference voltage, also changes, there is a significant change in liquid crystal application voltage, with the result that image noise is generated.

The second point to be noted here is that the liquid crystal display device 10 of the present embodiment carries out the after-mentioned operation to prevent image noise arising from changes in potential of the common electrode COM and the auxiliary capacitor lines CS at the time of a switch between the normal mode and the memory mode.

Figure 10:
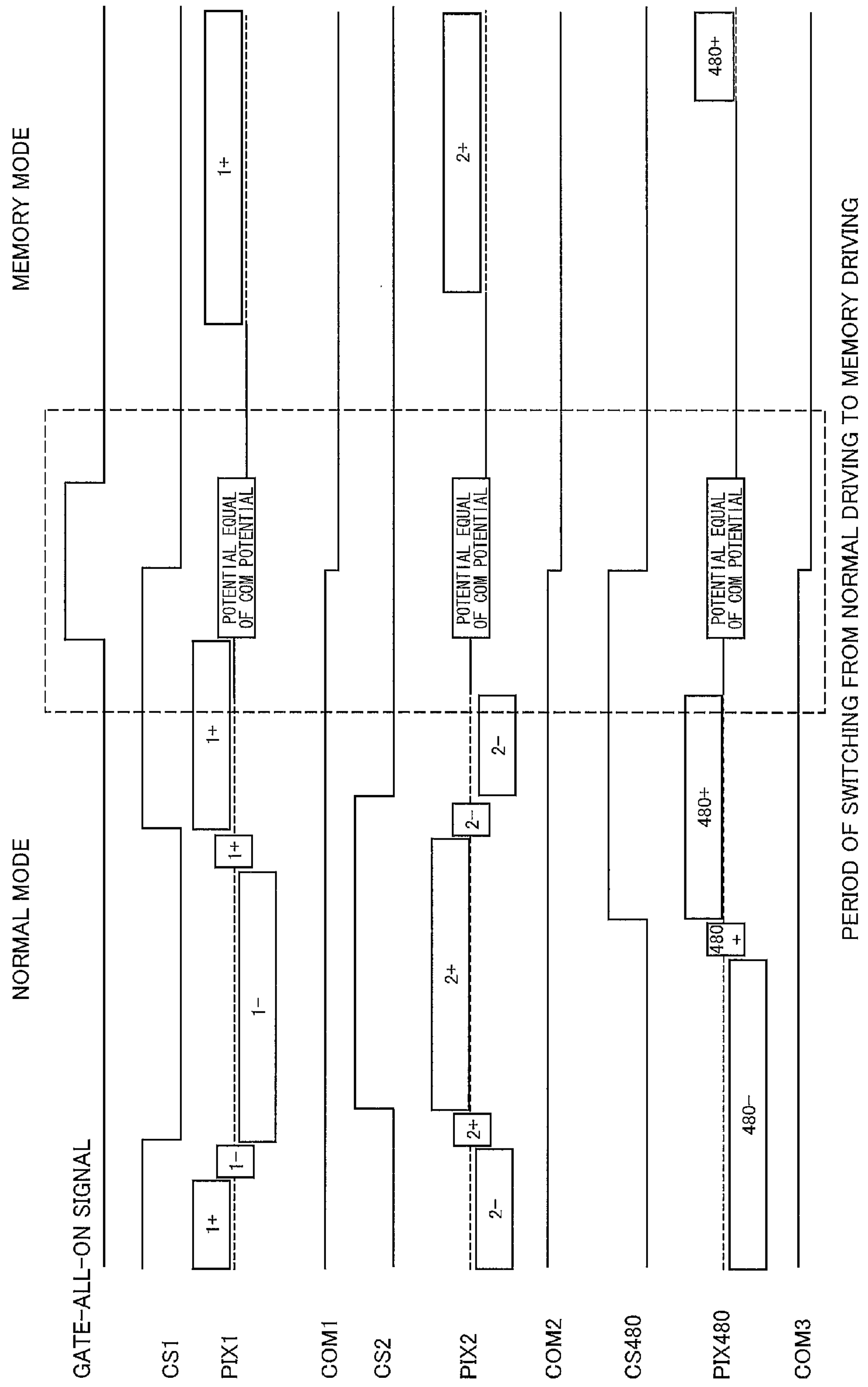
FIG. 10 is a timing chart showing waveforms of various signals in a case where an operation of preventing image noise is carried out when a switch from the normal mode to the memory mode is made in the liquid crystal display device.

FIG. 10 is a timing chart showing waveforms of various signals in a case where an operation of preventing image noise is carried out when a switch from the normal mode to the memory mode is made in the liquid crystal display device 10. The various signals shown in FIG. 10 are the same as those shown in FIG. 3, with the addition of a gate-all-ON signal.

As shown in FIG. 10, the liquid crystal display device 10 is configured such that in a case where it is necessary to cause the common electrode COM and the auxiliary capacitor lines CS to change in potential along with a switch between the normal mode and the memory mode, such a change in potential is made while holding the node PIX of each memory circuit MR1 at a potential equal to the potential of the common electrode COM with the transistor N1 of every memory circuit MR1 put in an on state by outputting a potential equal to the potential of the common electrode COM to all the source lines SL and bringing all the gate lines GL to a High (active) potential.

That is, with the node PIX of each memory circuit MR1 fixed at a potential equal to the potential of the common electrode COM, the common electrode COM and the auxiliary capacitor lines CS are made to change (shift) in potential to a predetermined potential. This frees the node PIX of each memory circuit MR1 from the influence of the change, thus making it possible to prevent image noise.

For example, in the case of normally black, image noise can be prevented in the following manner: the pixels are brought to a black potential at the time of a switch from the normal mode to the memory mode by turning ON the transistor N1 of every memory circuit MR1; then, with the pixels fixed at the black potential, the common electrode COM and the auxiliary capacitor lines CS are made to change (shift) in potential to a predetermined potential.

Although, in the foregoing description, the node PIX of each memory circuit MR1 is fixed at a potential equal to the potential of the common electrode COM by outputting a potential equal to the potential of the common electrode COM to all the source lines SL, this does not imply any limitation. The potential of the node PIX needs only be fixed by connecting the node PIX to the source line SL with the potential of the source line SL fixed.

Although the liquid crystal display device has been described above with reference to FIGS. 3, 4, 9, and 10 by taking, as an example, a case where sequential scanning begins from the first row of pixel memories 20 for writing of data. However, this does not imply any limitation. The order of scanning can be changed according to design. Further, although AC driving is a preferred method of driving during the normal mode, various driving methods can be used instead.

Further, although the memory circuit MR1 shown in FIG. 7 is constituted by N-channel transistors, it can of course be constituted by P-channel field-effect transistors instead. That is, the pixel memory 20 needs only be configured to carry out the data-retention operation explained with reference to FIGS. 5 and 6.

Further, although the pixel memory 20 has been described above by taking, as an example, a memory circuit MR1 that accurately carries out the refresh operation. However, from the point of view of preventing image noise, the pixel memory 20 can of course be constituted by a memory circuit MR100. Furthermore, from the point of view of preventing image noise, the pixel memory 20 may be a memory circuit that includes a refresh control section or the like for controlling a refresh operation and that operates (is driven) by switching between a normal mode during which the refresh operation is suspended and a memory mode during which the refresh operation is carried out, in which case the same effects can be brought about. Further, although the pixel memory 200 has been described as retaining data with two values (High potential and Low potential), it may retain data with three values or more.

Further, the liquid crystal display device 10 is applicable to a display device other than a liquid crystal display device. For example, the liquid crystal display device 10 can be applied to a display device including a display element such as a dielectric fluid.

In order to solve the foregoing problems, a display device of the present invention is a display device (i) including a display panel provided with a matrix of memory circuits and (ii) having a normal mode during which a display is carried out by a data signal potential written to the memory circuits for each frame and a memory mode during which a display is carried out by refreshing and retaining a data signal potential written to the memory circuits, the display panel including data signal lines, scanning signal lines, auxiliary capacitor lines, and a common electrode, the memory circuits each including: a pixel electrode; a first switch circuit for selectively making conduction or cutoff between a corresponding one of the data signal lines and the pixel electrode in accordance with a potential of a corresponding one of the scanning signal lines; a first capacitor formed between the pixel electrode and a corresponding one of the auxiliary capacitor lines; and a refresh control section for controlling a refresh of a potential of the pixel electrode, in a case where it is necessary to cause the common electrode and the auxiliary capacitor lines to change in potential along with a switch between the normal mode and the memory mode, the change in potential being made while electrically connecting the pixel electrode of each of the memory circuits to the data signal line with the data signal line having its potential fixed and with the first switch circuit in a conductive state.

Further, in order to solve the foregoing problems, a method for driving a display device of the present invention is a method for driving a display device (i) including a display panel provided with a matrix of memory circuits and (ii) having a normal mode during which a display is carried out by a data signal potential written to the memory circuits for each frame and a memory mode during which a display is carried out by refreshing and retaining a data signal potential written to the memory circuits, the display panel including data signal lines, scanning signal lines, auxiliary capacitor lines, and a common electrode, the memory circuits each including: a pixel electrode; a first switch circuit for selectively making conduction or cutoff between a corresponding one of the data signal lines and the pixel electrode in accordance with a potential of a corresponding one of the scanning signal lines; a first capacitor formed between the pixel electrode and a corresponding one of the auxiliary capacitor lines; and a refresh control section for controlling a refresh of a potential of the pixel electrode, in a case where it is necessary to cause the common electrode and the auxiliary capacitor lines to change in potential along with a switch between the normal mode and the memory mode, the method making the change in potential while electrically connecting the pixel electrode of each of the memory circuits to the data signal line with the data signal line having its potential fixed and with the first switch circuit in a conductive state.

Conventionally, image noise has sometimes been generated by the pixels suffering from changes since the pixel electrodes are floating in a case where the common electrode and the auxiliary capacitor lines change (shift) in potential at the time of a switch between the normal mode and the memory mode.

According to the foregoing configuration and method, on the other hand, in a case where it is necessary to cause the common electrode and the auxiliary capacitor lines to change in potential along with a switch between the normal mode and the memory mode, the change in potential being made while electrically connecting the pixel electrode of each of the memory circuits to the data signal line with the data signal line having its potential fixed and with the first switch circuit in a conductive state. That is, with the pixel electrode of each memory circuit fixed at a potential, the common electrode and the auxiliary capacitor lines are made to change (shift) in potential to a predetermined potential. This frees the pixel electrode of each memory circuit from the influence of the change, thus making it possible to prevent image noise.

Further, the display device of the present invention is preferably configured such that the data signal lines are fixed to a potential equal to a potential of the common electrode during the change in potential.

Further, the method for driving a display device of the present invention is preferably configured such that the data signal lines are fixed to a potential equal to a potential of the common electrode during the change in potential.

Furthermore, the display device of the present invention is preferably configured such that: the display panel further includes data transfer lines and refresh output lines; and the refresh control section includes a memory electrode, a second switching circuit for selectively making conduction or cutoff between the pixel electrode and the memory electrode in accordance with a potential of a corresponding one of the data transfer lines, a control section for supplying a potential for refreshing a potential of the pixel electrode in accordance with a potential of a corresponding one of the refresh output lines and a potential of the memory electrode, and a second capacitor formed between the memory electrode and the auxiliary capacitor line.

According to the foregoing configuration, the control section inside of the memory circuit supplies a potential for refreshing a potential of the pixel electrode. This makes it unnecessary to carry out the refresh from outside of the memory circuit. This makes it possible to achieve a reduction in the amount of power that is consumed for the refresh.

Further, the display device of the present invention is preferably configured such that: the memory circuits each further includes a potential supply source; and the control section is a third switch circuit for selectively making conduction or cutoff between the potential supply source and the pixel electrode in accordance with the potential of the refresh output line and the potential of the memory electrode.

According to the foregoing configuration, the control section can be achieved by a configuration that does not use an inverter; therefore, an increase in power consumption due to a through current can be avoided. Moreover, since the same potential is retained in the pixel electrode and the memory electrode, a malfunction can be avoided even in the presence of an off-leakage current in a transfer element used in the second switch circuit.

Further, the display device of the present invention is preferably configured such that: the first capacitor has a larger capacitance value than the second capacitor; the third switch circuit includes a first switch that uses a potential retained in the memory electrode as a control signal for conduction or cutoff and a second switch that uses the potential of the refresh output line as a control signal for conduction or cutoff; and the first switch and the second switch are connected in series to each other between an input of the third switch circuit and an output of the third switch circuit, the input of the third switch circuit being connected to the potential supply source and the output of the third switch circuit being connected to the pixel electrode.

According to the foregoing configuration, simply by making the second switch conductive, it can be made easy by a charge transfer between the first capacitor and the second capacitor to make the potential of the memory electrode closer to the potential that the pixel electrode had before the second switch was made conductive. The larger capacitance value the first capacitor has than the second capacitor, the greater this effect becomes. Further, the foregoing configuration makes it possible to easily achieve a configuration of the memory circuit in which after a data signal potential has been written to the pixel electrode, a potential for refreshing the pixel electrode is selectively supplied from the potential supply source without use of an inverter.

Further, the display device of the present invention is preferably configured such that the first switch circuit, the second switch circuit, the first switch, and the second switch are N-channel field-effect transistors.

According to the foregoing configuration, the first switch circuit, the second switch circuit, the first switch, and the second switch are N-channel field-effect transistors having the same polarity as one another. This makes it possible to fabricate the first switch circuit, the second switch circuit, the first switch, and the second switch simultaneously into the memory circuit, thus making the fabrication process easy. Further, the N-channel field-effect transistors allow the memory circuit to be fabricated using amorphous silicon.

Alternatively, the display device of the present invention is preferably configured such that the first switch circuit, the second switch circuit, the first switch, and the second switch are P-channel field-effect transistors.

According to the foregoing configuration, the first switch circuit, the second switch circuit, the first switch, and the second switch are P-channel field-effect transistors having the same polarity as one another. This makes it possible to fabricate the first switch circuit, the second switch circuit, the first switch, and the second switch simultaneously into the memory circuit, thus making the fabrication process easy.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can not only be suitably applied in the related field of memory-type display devices having a memory function that allows displays to be carried out on the basis of refreshed and retained data, but also be suitably used in the related field of methods for driving display devices and methods for manufacturing display devices. Furthermore, the present invention can be widely used in the related field of various electronic devices such as cellular phone displays.

REFERENCE SIGNS LIST

10 Liquid crystal display device (display device)

11 Pixel array

12 Driving signal generation circuit/video signal generation circuit

13 Demultiplexer

14 Gate driver/CS driver

15 Control signal buffer circuit

20 Pixel memory

MR1, MR100 Memory circuit

SW1, SW100 Switch circuit (first switch circuit)

TS1, TS100 Data transfer section (refresh control section, second switch circuit)

RS1 Refresh output control section (refresh control section, control section, third switch circuit)

RS100 Refresh output control section (refresh control section, control section)

DS1, DS101 First data-retention section

DS2, DS102 Second data-retention section

VS1 Supply source (potential supply source)

Ca1, Ca100 Capacitor (first capacitor)

Cb1, Cb100 Capacitor (refresh control section, second capacitor)

COM Common electrode

C1*c* Liquid crystal capacitor

PIX Node (pixel electrode)

MRY Node (refresh control section, memory electrode)

N1, N2 Transistor

N3 Transistor (first switch)

N4 Transistor (second switch)

SL(j) (1≤j≤m), SLx Source line (data signal line)

GL(i) (1≤i≤n), GLx Gate line (scanning signal line)

DT(i) (1≤i≤n), DTx Data transfer control line (data transfer line)

RC(i) (1≤i≤n), RCx Refresh output control line (refresh output line)

CS(i) (1≤i≤n), CSx Auxiliary capacitor line

The invention claimed is:

1. A display device (i) including a display panel provided with a matrix of memory circuits and (ii) having a normal mode during which a display is carried out by a data signal potential written to the memory circuits for each frame and a memory mode during which a display is carried out by refreshing and retaining a data signal potential written to the memory circuits, the display panel including data signal lines, scanning signal lines, auxiliary capacitor lines, and a common electrode, the memory circuits each comprising:

a pixel electrode;

a first switch circuit for selectively making conduction or cutoff between a corresponding one of the data signal lines and the pixel electrode in accordance with a potential of a corresponding one of the scanning signal lines;

a first capacitor formed between the pixel electrode and a corresponding one of the auxiliary capacitor lines; and a refresh control section for controlling a refresh of a potential of the pixel electrode, in a case where it is necessary to cause the common electrode and the auxiliary capacitor lines to change in potential along with a switch between the normal mode and the memory mode, the change in potential being made while electrically connecting the pixel electrode of each of the memory circuits to the data signal line with the data signal line having its potential fixed and with the first switch circuit in a conductive state.

2. The display device as set forth in claim 1, wherein the data signal lines are fixed to a potential equal to a potential of the common electrode during the change in potential.

3. The display device as set forth in claim 1, wherein:

the display panel further includes data transfer lines and refresh output lines; and the refresh control section includes a memory electrode, a second switching circuit for selectively making conduction or cutoff between the pixel electrode and the memory electrode in accordance with a potential of a corresponding one of the data transfer lines, a control section for supplying a potential for refreshing a potential of the pixel electrode in accordance with a potential of a corresponding one of the refresh output lines and a potential of the memory electrode, and a second capacitor formed between the memory electrode and the auxiliary capacitor line.

4. The display device as set forth in claim 3, wherein:

the memory circuits each further comprises a potential supply source; and the control section is a third switch circuit for selectively making conduction or cutoff between the potential supply source and the pixel electrode in accordance with the potential of the refresh output line and the potential of the memory electrode.

5. The display device as set forth in claim 4, wherein:

the first capacitor has a larger capacitance value than the second capacitor;

the third switch circuit includes a first switch that uses a potential retained in the memory electrode as a control signal for conduction or cutoff and a second switch that uses the potential of the refresh output line as a control signal for conduction or cutoff; and the first switch and the second switch are connected in series to each other between an input of the third switch circuit and an output of the third switch circuit, the input of the third switch circuit being connected to the potential supply source and the output of the third switch circuit being connected to the pixel electrode.

6. The display device as set forth in claim 5, wherein the first switch circuit, the second switch circuit, the first switch, and the second switch are N-channel field-effect transistors.

7. The display device as set forth in claim 5, wherein the first switch circuit, the second switch circuit, the first switch, and the second switch are P-channel field-effect transistors.

8. A method for driving a display device (i) including a display panel provided with a matrix of memory circuits and (ii) having a normal mode during which a display is carried out by a data signal potential written to the memory circuits for each frame and a memory mode during which a display is carried out by refreshing and retaining a data signal potential written to the memory circuits, the display panel including data signal lines, scanning signal lines, auxiliary capacitor lines, and a common electrode, the memory circuits each comprising:

a pixel electrode;

a first switch circuit for selectively making conduction or cutoff between a corresponding one of the data signal lines and the pixel electrode in accordance with a potential of a corresponding one of the scanning signal lines;

a first capacitor formed between the pixel electrode and a corresponding one of the auxiliary capacitor lines; and a refresh control section for controlling a refresh of a potential of the pixel electrode, in a case where it is necessary to cause the common electrode and the auxiliary capacitor lines to change in potential along with a switch between the normal mode and the memory mode, the method making the change in potential while electrically connecting the pixel electrode of each of the memory circuits to the data signal line with the data signal line having its potential fixed and with the first switch circuit in a conductive state.

9. The method as set forth in claim 8, wherein the data signal lines are fixed to a potential equal to a potential of the common electrode during the change in potential.

* * * * *